US008865849B2

(12) United States Patent
Crowther et al.

(10) Patent No.: US 8,865,849 B2
(45) Date of Patent: Oct. 21, 2014

(54) POLYETHYLENE AND PROCESS FOR PRODUCTION THEREOF

(71) Applicant: ExxonMobil Chemical Patents Inc., Baytown, TX (US)

(72) Inventors: Donna J. Crowther, Seabrook, TX (US); David M. Fiscus, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/856,729

(22) Filed: Apr. 4, 2013

(65) Prior Publication Data

US 2013/0289213 A1 Oct. 31, 2013

Related U.S. Application Data

(60) Division of application No. 13/275,680, filed on Oct. 18, 2011, now Pat. No. 8,436,114, which is a continuation-in-part of application No. 12/909,412, filed on Oct. 21, 2010, now Pat. No. 8,431,661, application No. 13/856,729, which is a continuation-in-part of application No. 12/909,412, filed on Oct. 21, 2010, now Pat. No. 8,431,661.

(51) Int. Cl.
| | |
|---|---|
| *C08F 4/652* | (2006.01) |
| *C08F 4/642* | (2006.01) |
| *C08F 4/6592* | (2006.01) |
| *C08F 210/16* | (2006.01) |
| *B32B 27/32* | (2006.01) |
| *C08F 297/08* | (2006.01) |
| *C08F 210/14* | (2006.01) |
| *C08F 299/00* | (2006.01) |
| *C08F 4/52* | (2006.01) |
| *C08F 4/659* | (2006.01) |

(52) U.S. Cl.
CPC ............... *C08F 210/14* (2013.01); *B32B 27/32* (2013.01); *C08F 4/65925* (2013.01); *C08F 297/08* (2013.01); *C08F 4/65916* (2013.01); *C08F 299/00* (2013.01); *C08F 4/52* (2013.01); *C08F 210/16* (2013.01); *Y10S 526/943* (2013.01)
USPC ........ 526/348.2; 526/160; 526/165; 526/348; 526/348.6; 526/943

(58) Field of Classification Search
CPC .. C08F 4/65912; C08F 4/6592; C08F 210/00; C08F 210/14
USPC ............ 526/160, 165, 348, 348.2, 348.6, 943
See application file for complete search history.

(56) References Cited

U.S. PATENT DOCUMENTS

| | | | |
|---|---|---|---|
| 5,227,440 | A | 7/1993 | Canich et al. |
| 5,382,630 | A | 1/1995 | Stehling et al. |
| 5,547,675 | A | 8/1996 | Canich |
| 6,034,024 | A | 3/2000 | Krzystowczyk et al. |
| 6,242,545 | B1 | 6/2001 | Jejelowo et al. |
| 6,248,845 | B1 | 6/2001 | Loveday et al. |
| 6,462,161 | B1 | 10/2002 | Cady et al. |
| 6,528,597 | B2 | 3/2003 | Loveday et al. |
| 6,635,779 | B1 | 10/2003 | Ewen et al. |
| 6,656,088 | B2 | 12/2003 | Nealey |
| 6,936,675 | B2 | 8/2005 | Szul et al. |
| 6,956,088 | B2 | 10/2005 | Farley et al. |
| 6,969,741 | B2 | 11/2005 | Lustiger et al. |
| 7,157,531 | B2 | 1/2007 | Szul et al. |
| 7,172,816 | B2 | 2/2007 | Szul et al. |
| 7,179,876 | B2 | 2/2007 | Szul et al. |
| 7,244,795 | B2 | 7/2007 | Agapiou et al. |
| 7,323,526 | B2 | 1/2008 | Agapiou et al. |
| 7,345,113 | B2 | 3/2008 | Van Dun et al. |
| 7,355,058 | B2 | 4/2008 | Luo et al. |
| 7,521,518 | B2 | 4/2009 | Jacobsen et al. |
| RE40,751 | E | 6/2009 | Jejelowo et al. |
| 2003/0055176 | A1 | 3/2003 | Jacobsen et al. |
| 2004/0152851 | A1 | 8/2004 | Weng et al. |
| 2005/0282980 | A1 | 12/2005 | Szul et al. |

(Continued)

FOREIGN PATENT DOCUMENTS

| | | |
|---|---|---|
| EP | 1 650 231 | 4/2006 |
| WO | WO 90/03414 | 4/1990 |
| WO | WO 00/14129 | 3/2000 |
| WO | WO 2004/108775 | 12/2004 |
| WO | WO 2006/054048 | 5/2006 |

(Continued)

OTHER PUBLICATIONS

Barron, "*New Method for the Determination of the Trialkylaluminum Content in Alumoxanes*", Organometallics, 1995, vol. 14, No. 7, pp. 3581-3583.

(Continued)

*Primary Examiner* — Caixia Lu
(74) *Attorney, Agent, or Firm* — Catherine L. Bell; Kevin M. Faulkner

(57) ABSTRACT

This invention relates to a process for polymerizing olefins in which the amount of trimethylaluminum in a methylalumoxane solution is adjusted to be from 1 to 25 mol %, prior to use as an activator, where the mol % trimethylaluminum is determined by $^1$H NMR of the solution prior to combination with any support. This invention also relates to a process for polymerizing olefins in which the amount of an unknown species present in a methylalumoxane solution is adjusted to be from 0.10 to 0.65 integration units prior to use as an activator, where the amount of the unknown species is determined by the $^1$H NMR spectra of the solution performed prior to combination with any support. Preferably, the methylalumoxane solution is present in a catalyst system also comprising a metallocene transition metal compound.

6 Claims, 6 Drawing Sheets

(56) References Cited

U.S. PATENT DOCUMENTS

| | | |
|---|---|---|
| 2006/0189769 A1 | 8/2006 | Hoang et al. |
| 2006/0293474 A1 | 12/2006 | Brant et al. |
| 2007/0260016 A1 | 11/2007 | Best et al. |
| 2008/0038533 A1 | 2/2008 | Best et al. |
| 2008/0045663 A1 | 2/2008 | Kolb et al. |
| 2009/0062492 A1 | 3/2009 | Luo et al. |
| 2009/0156764 A1 | 6/2009 | Malakoff et al. |
| 2009/0192270 A1 | 7/2009 | Malakoff et al. |
| 2009/0297810 A1 | 12/2009 | Fiscus et al. |

FOREIGN PATENT DOCUMENTS

| | | |
|---|---|---|
| WO | WO 2006/120418 | 11/2006 |
| WO | WO 2007/117520 | 10/2007 |
| WO | WO 2008/097422 | 8/2008 |
| WO | WO 2009/085922 | 7/2009 |
| WO | WO 2010/047709 | 4/2010 |

OTHER PUBLICATIONS

Bhriain et al., "*Polymeryl Exchange between ansa-Zirconocene Catalysts for Norbornene-Ethene Copolymerization and Aluminum or Zinc Alkyls*", Macromolecules, 2005, vol. 38, No. 6, pp. 2056-2063.

Busico et al., "*Hafnocenes and MAO: Beware of Trimethylaluminum*", Macromolecules, 2009, vol. 42, No. 6, pp. 1789-1791.

Busico et al., "*Improving the Perforamnce of Methylalumoxane: A Facile and Efficient Method to Trap "Free" Trimethylaluminum*", J. Am. Chem. Soc., 2003, vol. 125, No. 41, pp. 12402-12403.

Harney et al., "*C-Methylation of Alcohol by Trimethylaluminium*", Australian Journal of Chemistry, 1974, vol. 27, pp. 1639-1653.

Imhoff et al., "*Characterization of Methylaluminoxanes and Determination of Trimethylaluminum Using Proton NMR*", Organometallics, 1998, vol. 17, No. 10, pp. 1941-1945.

Imhoff et al., "*Determination of Trimethylaluminum and Characterization of Methylaluminoxanes Using Proton NMR*", American Chemical Society, 2000, pp. 177-191.

Liu et al., "*Bimodal Polyethylene Products from UNIPOL™ Single Gas Phase Reactor Using Engineered Catalysts*", Macromolecular Symposia, 2003, vol. 195, No. 1, pp. 309-316.

Reddy et al., "*Role of Trimethylaluminum on the Zirconocene-Methylaluminoxane-Catalyzed Polymerization of Ethylene*", Macromolecules, 1993, vol. 26, No. 5, pp. 1180-1182.

Tritto et al., "*Low Temperature $^1H$ and $^{13}C$ NMR Investigation of Trimethylaluminium Contained in Methylaluminoxane Cocatalyst for Metallocene-based Catalysts in Olefin Polymerization*", Macromol. Chem. Phys., 1996, vol. 197, No. 4, pp. 1537-1544.

Vadlamudi et al., Molecular Weight and Branching Distribution of a High Performance Metallocene Ethylene 1-Hexene Copolymer Film-Grade Resin, Macromolecular Symposia, 2009, vol. 282, pp. 1-13.

POLYETHYLENE AND PROCESS FOR PRODUCTION THEREOF

CROSS-REFERENCE TO RELATED APPLICATIONS

This application is a Divisional application of, and claims priority to, U.S. Ser. No. 13/275,680, filed Oct. 18, 2010; and also claims priority to and the benefit of U.S. Ser. No. 12/909,412, filed Oct. 21, 2010. This application is also a continuation in part of U.S. Ser. No. 12/909,412, filed Oct. 21, 2010.

FIELD OF THE INVENTION

This invention relates to polyethylene resins and catalyst and processes for the production thereof.

BACKGROUND OF THE INVENTION

Ethylene-based polymer materials are generally known in the art. For example, polymers and blends of polymers have typically been made from a linear low density polyethylene (LLDPE) prepared using Ziegler-Natta and/or metallocene catalyst in a gas phase process. Films made from conventional Ziegler-Natta catalyzed LLDPE's (ZN-LLDPE) are known to have favorable physical properties such as stiffness, lifting ability and tear resistance, but poor impact resistance. Films made from metallocene catalyzed LLDPE (m-LLDPE) are known to have superior impact resistance and suitable stiffness, but often suffer from drawbacks, such as low tear strength, in both the machine and transverse film directions, compared to films prepared with ZN LLDPE. Thus, the film industry has sought metallocene catalyzed film resins that exhibit favorable stiffness and tear resistance similar to, or better than, those prepared using ZN LLDPE resins, while retaining the superior impact resistance of films prepared using m-LLDPE reins. Specifically, the film industry wants films having a stiffness exceeding 200 MPa and both MD Elmendorf Tear and Dart Drop values equal to or exceeding 20 g/micron.

The film industry is still in search of methods and compositions that overcome these shortcomings and provide improved physical properties, improved processability, and an improved balance of properties.

U.S. Pat. No. 6,242,545 describes a process for the polymerization of monomers utilizing hafnium transition metal metallocene-type catalyst compound. The patent also describes the catalyst compound, which comprises at least one cyclopentadienyl ligand including at least one linear or isoalkyl substitutent of at least three carbon atoms.

U.S. Pat. Nos. 6,248,845 and 6,528,597 describe single reactor processes for the polymerization of monomers utilizing a bulky ligand hafnium transition metal metallocene-type catalyst compounds. These patents also describe an ethylene polymer composition produced by using bulky ligand hafnium metallocene-type catalysts.

U.S. Pat. No. 6,956,088 describes metallocene-catalyzed polyethylenes having relatively broad composition distribution and relatively broad molecular weight distribution. Specifically, U.S. Pat. No. 6,956,088 discloses thin (about 0.75 mil, 19 micron) blown films made from ethylene polymers made using a bis(n-propylcyclopentadienyl)hafnium dichloride and methylalumoxane that are reported to have a superior balance of stiffness, tear resistance, and impact resistance. However, this superior balance of properties can only be obtained under selected film fabrication conditions requiring extensive draws and high stretch rates. The metallocene-catalyzed polyethylenes of U.S. Pat. No. 6,956,088 lose their superior balance of film properties when made under typical draws and stretch rates used to make the majority of commercial films. In addition, these polyethylene films lose the superior balance of film properties as the gauge of the film is increased to be greater than about 0.75 mil (19 micron).

U.S. Pat. Nos. 6,936,675 and 7,172,816 describe polyethylene films produced from a polymer obtained using a hafnium-based metallocene catalyst. Methods for manufacturing the films are also described. These films do not have a balance of softness (lower 1% Secant Modulus), greater lifting ability (Tensile at Yield), and lower Ultimate Strain/Ultimate Stress ratios.

U.S. Patent Application Publication No. 2008/0038533 (specifically Examples 46, 47 and 48) discloses films made from polyethylene made from catalyst systems disclosed in U.S. Pat. No. 6,956,088. These films do not have a balance of softness (lower 1% Secant Modulus), greater lifting ability (Tensile at Yield), and lower Ultimate Strain/Ultimate Stress ratios.

U.S. Pat. Nos. 7,179,876 and 7,157,531 disclose films made from ethylene polymers made using a bis(n-propylcyclopentadienyl)hafnium metallocene and methylalumoxane. These films do not have a balance of softness (lower 1% Secant Modulus), greater lifting ability (Tensile at Yield), and lower Ultimate Strain/Ultimate Stress ratios.

This invention provides polyethylene and films thereof having improved physical properties, improved processability, and improved balance of properties.

Likewise, trimethylaluminum (TMA) has been used in some polymerizations as a scavenger, although some gas phase polymerizations prefer no scavenger such as TMA (see U.S. Pat. No. 6,956,088, column 5, lines 18-25, citing WO 96/08520).

Methylalumoxane (MAO) is often used as an activator with metallocene catalyst compounds and one common method of making MAO is the hydrolysis of TMA. Such hydrolysis however tends to leave residual TMA in the MAO which can have negative affects on polymerization.

WO 2004/108775 discloses "[a]dditional components, such as scavengers, especially ... alkylaluminum dialkoxide compounds and hydroxyl containing compounds, especially triphenylmethanol, and the reaction products of such hydroxyl containing compounds with alkylaluminum compounds, may be included in the catalyst composition of the invention if desired."

Others have noted that an increase in amounts of $AlMe_3$ in MAO can decrease catalytic activity in a number of systems, such as ring-opening polymerization of beta-lactones (see Organometallics, 1995, Vol. 14, pp. 3581-3583, footnote 5) and that trimethylaluminum does not appear to act as a co-catalyst (see Macromol. Chem. Phys., 1996, Vol. 197, pp. 1537-1544). Likewise, EP 1 650 231 A1 discloses that if a sterically hindered Lewis base is added to MAO, the TMA can become trapped and thus be prevented from interacting with the cationic species.

The reaction of triphenylmethanol and trimethylaluminum is disclosed in Harney D. W. et al., Aust. J. Chem., 1974, Vol. 27, pg. 1639.

Reddy et al. in Macromolecules, 1993, 26, 1180-1182 disclose that with increasing addition of free TMA to MAO both catalyst productivity and molecular weight decrease but that in homogeneous catalysts for ethylene polymerization, addition of TMA to MAO under specific conditions can lead to a dramatic increase in catalyst productivity and lifetime.

Other references of interest include US 2005/0282980; Busico, et al. Macromolecules 2009, 42, 1789-1791; and Imhoff, et al., Olefin Polymerization, Chapter 12, pages 177-191 (published by American Chemical Society, 1999).

This invention also provides a process utilizing TMA in combination with MAO to achieve enhanced polymerizations as well as enhanced product properties, such as enhanced tensile performance of polyethylene films. The processes disclosed herein offer the previously unknown ability to alter polymer microstructure and physical properties by manipulating the amount of TMA, or unknown species (defined below) in a MAO/TMA solution. In particular, the processes disclosed herein offer the possibility to influence the (intra- and/or intermolecular) comonomer distribution and/or the molecular weight distribution in a copolymer by adjusting the amount of TMA in a catalyst system.

The disclosed processes also offer on-line control in a continuous process of polymer microstructure and physical properties by means of controlling on-line the amount of TMA and/or an unknown species present in the MAO solution as described hereinbelow.

SUMMARY OF THE INVENTION

This invention relates to a process for polymerizing olefins in which the amount of trimethylaluminum in a methylalumoxane solution is adjusted to be from 1 to 25 mol %, prior to use as an activator, where the mol % trimethylaluminum is determined by $^1$H NMR of the solution prior to combination with any support, wherein the methylalumoxane solution preferably contains at least 2 mol % MAO.

This invention also relates to a process for polymerizing olefins in which the amount of an unknown species present in a methylalumoxane solution is adjusted to be from 0.10 to 0.65 integration units, prior to use as an activator, where the unknown species is identified in the $^1$H NMR spectra of the MAO solution prior to combination with any support and the integration units of the unknown species are defined on the basis of the TMA peak being normalized to 3.0 integration units.

This invention relates to a process for polymerizing olefins in which the amount of trimethylaluminum in a methylalumoxane solution is adjusted to be from 1 to 25 wt %, prior to use as an activator, where the wt % trimethylaluminum is determined by $^1$H NMR of the solution prior to combination with any support.

This invention also relates to a method to produce block copolymers comprising adjusting, preferably adjusting on-line, the amount of trimethyl aluminum in a methylalumoxane solution prior to use, preferably in a continuous process, as an activator to obtain comonomer triad [HHH] components in the different segments (also referred to as blocks) that differ by at least 5% relative to each other.

This invention also relates to a copolymer comprising ethylene and from 0.5 to 25 mol % of $C_3$ to $C_{20}$ olefin comonomer, said copolymer having: a tensile stress at the secondary yield point of 1.5 MPa or more; a ratio of ultimate tensile strain to ultimate tensile stress of 19.9 or more; a tensile stress at 200% elongation (MPa) that is greater than the tensile stress at the secondary yield point (MPa); a comonomer triad ([HHH] triad) of 0.0005 mol % or more (preferably 0.0006 mol % or more); a density of 0.910 g/cm$^3$ or more; and a 1% secant modulus of 30 to 100 MPa.

This invention further relates to polyethylene resins and to the preparation of said polyethylene resins (typically copolymer comprising ethylene and from 0.5 to 25 mol % of $C_3$ to $C_{20}$ olefin comonomer), having improved tensile properties by polymerizing ethylene and comonomer (such as hexene) together using a catalyst having as a transition metal component a bis(n-$C_{3-4}$ alkyl cyclopentadienyl)hafnium compound and selected amounts of aluminum compounds (such as TMA) wherein the polymer product has: 1) a ratio of Ultimate Tensile Stress to Tensile Stress at 100% elongation of 2.4 or more; 2) a ratio of Ultimate Tensile Stress to Tensile Stress at 300% elongation of 2.5 or more; 3) a ratio of Ultimate Tensile Stress to Tensile Stress at the primary yield point of 2.9 or more; 4) a density of 0.910 g/cm$^3$ or more; 5) a 1% secant modulus of 30 to 100 MPa; and 6) a Tensile Stress of Y MPa or more, where Y=(0.0532)*Z–8.6733 and Z is the percent strain and is a number from 500 to 2000, preferably from 500 to 1000, preferably 500, 550, 600, 650, 700, 800, 850, 900, 950, or 1000, preferably 500. Alternately Y=(0.0532)*Z–9.0, alternately Y=(0.0532)*Z–9.5. See FIG. 6, where, for example, the stress at 800% strain is approximately 33.9 MPa.

DETAILED DESCRIPTION OF THE INVENTION

Figure 1:
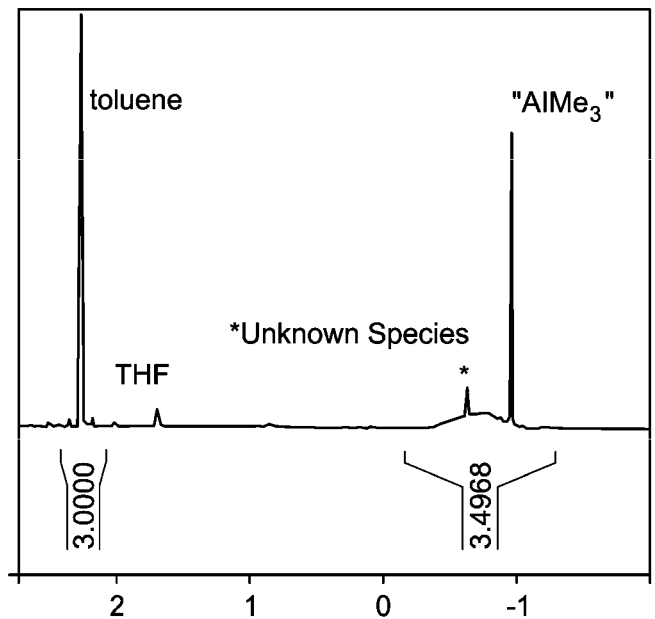
FIG. 1 is the $^1$H NMR spectrum of the MAO (30 wt % in toluene) used in the Examples.

For the purposes of this invention and the claims thereto the new numbering scheme for the Periodic Table Groups are used as described in CHEMICAL AND ENGINEERING NEWS, 1985, 63(5), pg. 27.

For the purposes of this invention and the claims thereto when a polymer is referred to as comprising an olefin, the olefin present in the polymer is the polymerized form of the olefin, for example, polyethylene comprises units derived from ethylene. Likewise when catalyst components are described as comprising neutral stable forms of the components, it is well understood by one of ordinary skill in the art, that the ionic form of the component is the form that reacts with the monomers to produce polymers. In addition, a reactor is any container(s) in which a chemical reaction occurs.

In the description herein the transition metal compound may be described as a catalyst precursor, a pre-catalyst compound, or a catalyst compound, and these terms are used interchangeably. A catalyst system is the combination of a catalyst precursor, an activator, optional co-activator and optional support. Preferred catalyst systems useful herein include a catalyst compound, methylalumoxane, trimethylaluminum and an optional support. A "MAO solution" is the combination of solvent (such as toluene) and methylalumoxane (preferably present at at least 2 mol %, preferably at least 5 mol %, preferably at least 10 mol %, preferably at least 15 mol %, preferably at least 20 mol %) but excludes catalyst compounds.

By continuous is meant a system that operates without interruption or cessation. For example, a continuous process to produce a polymer would be one where the reactants are continually introduced into one or more reactors and polymer product is continually withdrawn.

For the purposes of this invention and the claims thereto, wt % is weight percent, Me is methyl, Pr is propyl, n-Pr is normal propyl, Ph is phenyl, TMA is trimethylaluminum, MAO is methylalumoxane, and Cp is cyclopentadienyl. MD is machine direction and TD is transverse direction. As used herein, the terms "low density polyethylene," "LDPE," "linear low density polyethylene," and "LLDPE" refer to a polyethylene homopolymer or copolymer having a density from 0.910 to 0.945 g/cm$^3$. The terms "polyethylene" and "ethylene polymer" mean a polyolefin comprising at least 50 mol % ethylene units. Preferably, the "polyethylene" and "ethylene polymer" comprise at least 60 mol %, preferably at least 70 mol %, preferably at least 80 mol %, even preferably at least 90 mol %, even preferably at least 95 mol %, or preferably 100 mol % ethylene units; and preferably have less than 15 mol % propylene units. An "ethylene elastomer" is an ethylene copolymer having a density of less than 0.86 g/cm$^3$. An "ethylene plastomer" (or simply a "plastomer") is an ethylene copolymer having a density of 0.86 to less than 0.91 g/cm$^3$. A "high density polyethylene" ("HDPE") is an ethylene polymer having a density of more than 0.945 g/cm$^3$. A "polymer" has two or more of the same or different mer units. A "homopolymer" is a polymer having mer units that are the same. A "copolymer" is a polymer having two or more mer units that are different from each other. The term "different" as used to refer to mer units indicates that the mer units differ from each other by at least one atom or are different isomerically. Accordingly, polymers having more than two types of monomers, such as terpolymers, are also included within the term "copolymer" as used herein. The terms "polypropylene" and "propylene polymer" mean a polyolefin comprising at least 50 mol % propylene units.

Peak Melting Point (Tm), heat of fusion (Hf), peak crystallization point (Tc) and heat of crystallization (Hc) are determined by DSC as described below in the Examples section.

Unless otherwise stated, molecular weight distribution ("MWD") is $M_w/M_n$. Measurements of weight average molecular weight ($M_w$), number average molecular weight ($M_n$), and z average molecular weight (Mz) are determined by Gel Permeation Chromatography as described in the Examples section below.

Melt index (MI) and high load melt index (HLMI) are determined according to ASTM 1238 (190° C., 2.16 (I-2) or 21.6 kg (I-21), respectively). Melt index ratio (MIR) is determined according to ASTM 1238 and is the ratio of HLMI to MI (e.g., I-21/I-2). In the event a weight is not specified as part of a melt index, it is assumed that 2.16 kg was used. Density is determined using chips cut from plaques compression molded in accordance with ASTM D-4703-07 and aged for 40 hrs at 23° C. plus or minus 2° C. and measured as specified by ASTM D-1505, unless otherwise stated. Tensile properties, including Youngs modulus, tensile strength, stress, ultimate tensile stress, strain, ultimate strain, stress at 100% elongation, stress at 300% elongation, stress at the primary yield point, and stress at the secondary yield point, 1% and 2% Secant Modulus are determined according to by ASTM D-882, except that the compression molded films were prepared as described below in the Examples section. Dart Impact is determined according to ASTM D-1709, method A. Elmendorf Tear (MD and TD) is determined according to ASTM D-1922. Intrinsic tear is measured on a compression molded sheet using the Elmendorf tear (type B) method as described in ASTM D-1922.

Unless otherwise stated, $^{13}$C NMR spectroscopic analysis is conducted as follows: Polymer samples for $^{13}$C NMR spectroscopy are dissolved in d$_2$-1,1,2,2-tetrachloroethane at concentrations between 10-15 weight percent prior to being inserted into the spectrometer magnet. $^{13}$C NMR data is collected at 120° C. in a 10 mm probe using a Varian spectrometer with a $^1$Hydrogen frequency of 700 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating, is employed during the entire acquisition period. The spectra is acquired using time averaging to provide a signal to noise level adequate to measure the signals of interest. $^{13}$C NMR Chemical Shift Assignments and calculations involved in characterizing polymers are made as outlined in the work of M. R. Seger and G. Maciel, "Quantitative $^{13}$C NMR Analysis of Sequence Distributions in Poly(ethylene-co-1-hexene)", 2004, Anal. Chem., Vol. 76, pp. 5734-5747; J. C. Randall, "Polymer Sequence Determination: Carbon-13 NMR Method" Academic Press, New York, 1977; and K. L. Koenig "Chemical Microstructure of Polymer Chains," Robert E. Krieger Publishing Company, Florida 1990. For example, triad concentrations in ethylene hexene copolymers are determined by spectral integration and normalized to give the mol fraction of each triad: ethylene-ethylene-ethylene (EEE), ethylene-ethylene-hexene (EEH), ethylene-hexene-ethylene (EHE), hexene-ethylene-ethylene (HEE), hexene-ethylene-hexene (HEH), hexene-hexene-hexene (HHH). The observed triad concentrations are converted into the following diad concentrations: ethylene-ethylene (EE), hexene-hexene (HH) and ethylene-hexene (EH). The diad concentrations are determined by the following equations, where A represents one monomer and B the other.

$$[AA]=[AAA]+[AAB]/2$$

$$[AB]=2*[ABA]+[BBA]$$

The diad concentrations are then used to establish $r_1r_2$ as follows:

$$r_1r_2 = 4*\frac{EE*HH}{(EH)^2}.$$

Mol percent 1-hexene (Mol % comonomer) is determined as follows:

$$\text{Mol Percent Hexene}=(HHH+HHE+EHE)*100.$$

Run Number is determined as follows:

$$\text{Run Number} = \left(HEH + \frac{1}{2} * HEE\right) * 100.$$

Average ethylene run length is calculated by dividing the comonomer content by the run number. Average Ethylene Run Length=(HEH+EEH+EEE)/(run number).

"Butyls" per 1000 carbons is calculated by dividing the 1-hexene-centered triads by the sum of twice the ethylene-centered triads plus six times the 1-hexene-centered triads and the resultant quotient multiplying by 1000.

Butyls per 1000 Carbons =

$$\frac{HHH + HHE + EHE}{6*(HHH + HHE + EHE) + 2(HEH + EEH + EEE)} * 1000$$

In ethylene copolymers where the comonomer is not hexene, the same procedure as above is employed and the H in the above examples would represent the comonomer. For example, in an ethylene-butene copolymer the H would represent the butene monomer, in an ethylene-octene copolymer the H would represent the octene monomer, etc. Likewise, in situations where there is more than one comonomer, then the H in the formulae above would represent all the comonomers. Further, when making comparisons of the copolymers produced herein to a random copolymer, a Bernoullian distribution is used to represent the random copolymer as set out in K. L. Koenig "Chemical Microstructure of Polymer Chains", Robert E. Krieger Publishing Company, Florida 1990.

Proton ($^1$H) NMR data for polymers is collected at 120° C. in a 5 mm probe using a Varian Spectrometer with a $^1$Hydrogen frequency of at least 400 MHz. The data is recorded using a maximum pulse width of 45 degrees, 8 seconds between pulses and signal averaging 120 transients.

Preparative TREF (Temperature Rising Elution Fractionation) fractionation of the polymers in the example section below was performed by Polymer Char (a.k.a. Polymer Characterization, S.A.), Valencia Spain. Polymer Char's procedure used a commercial preparative TREF instrument (Model MC2, Polymer Char S.A.) to fractionate the resin into Chemical Composition Fractions. This procedure employs a sequential TREF separation. Approximately 1 gram of resin is dissolved in 100 ml of xylene, stabilized with 600 ppm of butylated hydroxy toluene (BHT), at 130° C. for one hour. The solution is crystallized by slowly cooling it down to 30° C. or to subambient temperatures using a cooling rate of 0.2° C. The cooled sample is heated at its lowest temperature (30° C. or to subambient temperatures) for 45 minutes and then the first fraction (the most amorphous) is collected into an external bottle, the rest of the polymer remains in the vessel as it has been retained by the filter. Subsequent fractions are obtained by increasing the temperature stepwise, by about 3° C. per step, to within a specified temperature range (such as a peak temperature), heated within that specified temperature range for 45 minutes and repeating the same isolation procedure as for the first fraction. Once all the fractions are isolated in the external bottles, the polymer is precipitated by adding acetone and cooling the bottles. Then the mixture is filtered using an external filtration system and recovering the physical fractionated polymer.

Polymer Products

The process of this invention produces olefin polymers, preferably polyethylene and polypropylene homopolymers and copolymers. In a preferred embodiment, the polymers produced herein are copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the monomer is ethylene and the comonomer is hexene, preferably from 1 to 15 mol % hexene, alternately 1 to 10 mol %. In another preferred embodiment, the monomer is ethylene and the comonomer is hexene, preferably from 0.5 to 20 mol % hexene, alternately from 3 to 10 mol % hexene.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3).

In a preferred embodiment, the polymers produced herein have a deviation from random of greater than 0 for the [EHE] mol fraction. Likewise, the polymers produced herein have a deviation from random of greater than 0 for the [HHH] mol fraction. Deviation from random is equal to the observed mol fraction minus the value of the mol fraction for a random copolymer calculated using the Bernoullian distribution for random copolymers as set out in K. L. Koenig "Chemical Microstructure of Polymer Chains", Robert E. Krieger Publishing Company, Florida 1990, hereinafter referred to as "calculated random mol fraction".

In a Bernoulli process, a completely random process, the probability of obtaining a test result, called P(x), is given by the Binomial Distribution:

$$P(n) = \frac{n!}{x!(n-x)!}(1-p)^{(n-x)}(p)^x$$

where x is a particular test result obtained in set of evaluations (n) and p is the probability that of observing the result (x).

Application of the Binomial Distribution to determining the distribution of triads in a random copolymer requires x be the number of hexene monomers in the triad, taking on the values of 0, 1, 2 or 3 ([EEE], [HEE], [HHE] and [HHH]), n equals three and p is the mol fraction of hexene in the copolymer.

Application of the Binomial Distribution to determining the loading of triads in a random copolymer having the same hexene mol fraction as the sample resins requires filling out the following table, where p is equal to the mol fraction of hexene in the resin.

| | x | $\frac{3!}{x!(3-x)!}$ | $(1-p)^{(3-x)}$ | $(p)^x$ | P(x) |
|---|---|---|---|---|---|
| EEE** | 0 | 1 | $(1-p)^3$ | $p^0$ | $P(EEE) = 1*(1-p)^3 p^0$ |
| HEE** | 1 | 3 | $(1-p)^2$ | $p^1$ | $P(HEE) = 1*(1-p)^2 p^1$ |
| HHE** | 2 | 3 | $(1-p)^1$ | $p^2$ | $P(HHE) = 1*(1-p)^1 p^2$ |
| HHH** | 3 | 1 | $(1-p)^0$ | $p^3$ | $P(HHH) = 1*(1-p)^0 p^3$ |

** unordered

The loading of the HEE and HHE triads are used to define the loading of the triads with a specific monomer sequence: HEE, EHE, HHE and HEH. The results in the above table are used as shown in the following table to define the loading of the specific sequence of triads in a random copolymer having mol fraction of hexene equal to p.

| | |
|---|---|
| [HHH] | P(HHH) |
| [HHE] | (2/3) * P(HHE) |
| [EHE] | (1/3) * P(HEE) |
| [HEH] | (1/3) * P(HHE) |
| [EEH] | (2/3) * P(HEE) |
| [EEE] | P(EEE) |

The following Table 6 is reproduced from the Example section.

TABLE 6

$^{13}$C NMR Analysis of LGPR resins: Observed Triad Loading (Mol Fraction)

| Catalyst | Mol % H | Mol % E | HHH | HHE | EHE | HEH | HEE | EEE |
|---|---|---|---|---|---|---|---|---|
| 36 | 1.6 | 98.4 | 0.0001 | 0.0004 | 0.0156 | 0.0002 | 0.0311 | 0.9527 |
| 37 | 3.4 | 96.6 | 0.0006 | 0.0018 | 0.0323 | 0.0025 | 0.0615 | 0.9013 |
| 39 | 3.5 | 96.5 | 0.0003 | 0.0020 | 0.0331 | 0.0020 | 0.0636 | 0.8990 |
| 41 | 3.36 | 96.64 | 0.0002 | 0.0020 | 0.0318 | 0.0021 | 0.0612 | 0.9028 |
| 44 | 3.51 | 96.49 | 0.0003 | 0.0018 | 0.0335 | 0.0025 | 0.0635 | 0.8984 |
| 42 | 3.24 | 96.76 | 0.0003 | 0.0017 | 0.0309 | 0.0022 | 0.0585 | 0.9064 |
| 43 | 3.29 | 96.71 | 0.0000 | 0.0019 | 0.0313 | 0.0019 | 0.0601 | 0.9048 |
| 46 | 3.21 | 96.79 | 0.0003 | 0.0014 | 0.0309 | 0.0021 | 0.0586 | 0.9068 |
| 46 | 3.35 | 96.65 | 0.0003 | 0.0017 | 0.0318 | 0.0019 | 0.0616 | 0.9027 |
| Y | 3.1 | 96.9 | 0.0000 | 0.0015 | 0.0289 | 0.0017 | 0.0574 | 0.9107 |
| X | 3.31 | 96.69 | 0.0004 | 0.0009 | 0.0254 | 0.0014 | 0.0488 | 0.9231 |

TABLE 6A

Observed Triad Loading (Mol Fraction) without restricting the sequence of the monomers in the triad (unordered).

| | Catalyst | | | | | | | | | |
|---|---|---|---|---|---|---|---|---|---|---|
| | 36 | 37 | 39 | 41 | 44 | 42 | 43 | 46 | 46 | X | Y |
| HHH** | 0.0001 | 0.0006 | 0.0003 | 0.0002 | 0.0003 | 0.0003 | 0.0000 | 0.0003 | 0.0003 | 0.0004 | 0.0000 |
| HHE** | 0.0006 | 0.0043 | 0.0040 | 0.0041 | 0.0043 | 0.0039 | 0.0038 | 0.0035 | 0.0036 | 0.0023 | 0.0032 |
| HEE** | 0.0467 | 0.0938 | 0.0967 | 0.0930 | 0.0970 | 0.0894 | 0.0914 | 0.0895 | 0.0934 | 0.0742 | 0.0863 |
| EEE** | 0.9527 | 0.9013 | 0.8990 | 0.9028 | 0.8984 | 0.9064 | 0.9048 | 0.9068 | 0.9027 | 0.9231 | 0.9107 |

**unordered

The table below shows the results of applying the binomial distribution to determining the triad distributions of a random copolymer with the same hexene mol fraction as the resins in the example, X and Y resins.

TABLE 6B

Predicted Triad Loadings (Mol Fraction) for a random copolymer with the indicated hexene content.ˆ

| | Catalyst | | | | | | | | | | |
|---|---|---|---|---|---|---|---|---|---|---|---|
| | 36 | 37 | 39 | 41 | 44 | 42 | 43 | 46 | 46 | X | Y |
| Hexene Mol Fraction | 0.0160 | 0.0340 | 0.0350 | 0.0336 | 0.0351 | 0.0324 | 0.0329 | 0.0321 | 0.0335 | 0.0331 | 0.0310 |
| Triad Loading | | | | | | | | | | | |
| HHH | 0.0000 | 0.0000 | 0.0000 | 0.0000 | 0.0000 | 0.0000 | 0.0000 | 0.0000 | 0.0000 | 0.0000 | 0.0000 |
| HHE | 0.0005 | 0.0022 | 0.0024 | 0.0022 | 0.0024 | 0.0020 | 0.0021 | 0.0020 | 0.0022 | 0.0021 | 0.0019 |
| EHE | 0.0155 | 0.0317 | 0.0326 | 0.0314 | 0.0327 | 0.0303 | 0.0308 | 0.0301 | 0.0313 | 0.0309 | 0.0291 |
| HEH | 0.0003 | 0.0011 | 0.0012 | 0.0011 | 0.0012 | 0.0010 | 0.0010 | 0.0010 | 0.0011 | 0.0011 | 0.0009 |
| HEE | 0.0310 | 0.0635 | 0.0652 | 0.0628 | 0.0654 | 0.0607 | 0.0615 | 0.0601 | 0.0626 | 0.0619 | 0.0582 |
| EEE | 0.9528 | 0.9014 | 0.8986 | 0.9025 | 0.8984 | 0.9059 | 0.9045 | 0.9068 | 0.9028 | 0.9040 | 0.9099 |

ˆall calculations done in Excel ™ 2003 with expression to 4 decimal places.

TABLE 6C

Predicted Triad Loading (Mol Fraction) for a random copolymer with the indicated Hexene content without restricting the sequence of the monomers in the triad (unordered).^

| | Catalyst | | | | | | | | | | |
|---|---|---|---|---|---|---|---|---|---|---|---|
| | 36 | 37 | 39 | 41 | 44 | 42 | 43 | 46 | 46 | X | Y |
| Hexene Mol Fraction | 0.0160 | 0.0340 | 0.0350 | 0.0336 | 0.0351 | 0.0324 | 0.0329 | 0.0321 | 0.0335 | 0.0331 | 0.0310 |
| | Triad Loading | | | | | | | | | | |
| HHH** | 0.0000 | 0.0000 | 0.0000 | 0.0000 | 0.0000 | 0.0000 | 0.0000 | 0.0000 | 0.0000 | 0.0000 | 0.0000 |
| HHE** | 0.0008 | 0.0034 | 0.0035 | 0.0033 | 0.0036 | 0.0030 | 0.0031 | 0.0030 | 0.0033 | 0.0032 | 0.0028 |
| HEE** | 0.0465 | 0.0952 | 0.0978 | 0.0941 | 0.0980 | 0.0910 | 0.0923 | 0.0902 | 0.0939 | 0.0928 | 0.0873 |
| EEE** | 0.9528 | 0.9014 | 0.8986 | 0.9025 | 0.8984 | 0.9059 | 0.9045 | 0.9068 | 0.9028 | 0.9040 | 0.9099 |

**unordered,
^all calculations done in Excel ™ 2003 with expression to 4 decimal places.

The following tables report the deviation from random of the triad loadings for the example resins from those of a random copolymer with the same hexene content.

TABLE 6D

Deviation of the Observed Triad Loading from that of a random copolymer with same hexene content

| | Catalyst | | | | | | | | | | |
|---|---|---|---|---|---|---|---|---|---|---|---|
| | 36 | 37 | 39 | 41 | 44 | 42 | 43 | 46 | 46 | X | Y |
| Hexene Mol Fraction | 0.0160 | 0.0340 | 0.0350 | 0.0336 | 0.0351 | 0.0324 | 0.0329 | 0.0321 | 0.0335 | 0.0331 | 0.0310 |
| | Deviation from Random | | | | | | | | | | |
| HHH | 0.0001 | 0.0006 | 0.0003 | 0.0002 | 0.0003 | 0.0003 | 0.0000 | 0.0003 | 0.0003 | 0.0004 | 0.0000 |
| HHE | −0.0001 | −0.0004 | −0.0004 | −0.0002 | −0.0006 | −0.0003 | −0.0002 | −0.0006 | −0.0005 | −0.0012 | −0.0004 |
| EHE | 0.0001 | 0.0006 | 0.0005 | 0.0004 | 0.0008 | 0.0006 | 0.0005 | 0.0008 | 0.0005 | −0.0055 | −0.0002 |
| HEH | −0.0001 | 0.0014 | 0.0008 | 0.0010 | 0.0013 | 0.0012 | 0.0009 | 0.0011 | 0.0008 | 0.0003 | 0.0008 |
| HEE | 0.0001 | −0.0020 | −0.0016 | −0.0016 | −0.0019 | −0.0022 | −0.0014 | −0.0015 | −0.0010 | −0.0131 | −0.0008 |
| EEE | −0.0001 | −0.0001 | 0.0004 | 0.0003 | 0.0000 | 0.0005 | 0.0003 | 0.0000 | −0.0001 | 0.0191 | 0.0008 |

*Positive numbers indicate triad loadings greater than that expected for a random copolymer of similar hexene content.

TABLE 6E

Deviation of the Observed Triad Loading from that of a random copolymer with same Hexene content without restricting the sequence of the monomers in the triad (unordered).

| | Catalyst | | | | | | | | | | |
|---|---|---|---|---|---|---|---|---|---|---|---|
| | 36 | 37 | 39 | 41 | 44 | 42 | 43 | 46 | 46 | X | Y |
| Hexene Mol Fraction | 0.0160 | 0.0340 | 0.0350 | 0.0336 | 0.0351 | 0.0324 | 0.0329 | 0.0321 | 0.0335 | 0.0331 | 0.0310 |
| | Triad Loading | | | | | | | | | | |
| HHH | 0.0001 | 0.0006 | 0.0003 | 0.0020 | 0.0003 | 0.0003 | 0.0000 | 0.0003 | 0.0003 | 0.0004 | 0.0000 |
| HHE | −0.0002 | 0.0009 | 0.0005 | 0.0008 | 0.0007 | 0.0009 | 0.0005 | 0.0003 | −0.0009 | 0.0004 | |
| HEE | 0.0002 | −0.0014 | −0.0011 | −0.0011 | −0.0010 | −0.0016 | −0.0009 | −0.0007 | −0.0005 | −0.0186 | −0.0010 |
| EEE | −0.0001 | −0.0001 | 0.0004 | 0.0003 | 0.0000 | 0.0005 | 0.0003 | 0.0000 | −0.0001 | 0.0191 | 0.0008 |

*Positive numbers indicate triad loadings greater than that expected for a random copolymer of similar Hexene content.

In another embodiment, for the polymers produced herein the deviation from random for the [EEE] fraction divided by mol % comonomer in the polymer times 100 is less than 10, preferably less than 5, preferably less than 3. Specifically, in a preferred embodiment, for the polymers produced herein the ((observed [EEE] triad fraction minus the calculated random [EEE] fraction) divided by mol % hexene in the polymer*100) is less than 10, preferably less than 5, preferably less than 3 (where E=ethylene).

In another preferred embodiment, the polymers produced herein have an [HHE]** mol fraction of greater than 0.005%, preferably greater than 0.006%, preferably greater than 0.007%, where E=ethylene, and H is comonomer, preferably hexene.

In a preferred embodiment, the polymers prepared herein have:
1) a Youngs Modulus of at least 215 MPa (alternately at least 230 MPa, alternately at least 260 MPa); and/or
2) a 1% Secant Modulus of 30 to 100 MPa (alternately 35 to 90 MPa, alternately 40 to 85 MPa); and/or
3) a 2% Secant Modulus of at least 100 MPa (alternately at least 101 MPa, alternately at least 102 MPa); and/or
4) an Ultimate Tensile Strain to Ultimate Tensile Stress ratio of about 15 or more (preferably 20 or more, preferably 21 or more); and/or
5) a tensile strength of at least Y MPa (alternately at least 17 MPa, alternately at least 18 MPa, alternately at least 19 MPa), where Y=(0.041)*Z−3.02 and Z is the percent strain (also referred to as the percent elongation) and is a number from 500 to 2000, preferably 500 to 1000, preferably 500, 550, 600, 650, 700, 800, 850, 900, 950, or 1000, preferably 500. Alternately, Y=(0.041)*Z−3.5. Alternately, Y=(0.041)*Z−4.0; and/or
6) a density of 0.910 to 0.945 g/cc (preferably from 0.920 to 0.940 g/cc, preferably from 0.921 to 0.935 g/cc, preferably from 0.917 to 0.918 g/cc).

Particularly useful ethylene copolymers (including those described in the preceding paragraph), such as ethylene-butene, ethylene-hexene, and/or ethylene-octene copolymers, prepared herein, preferably have:
1) an [HHH] triad content of 0.0005 mol % or more (preferably 0.0006 mol % or more) where H is the comonomer (preferably butene, hexene or octene, preferably hexene); and/or
2) an $r_1 r_2$ value of 0.85 or more (alternately 0.94 or more, alternately 1.27 or more); and/or
3) "butyls" per 1000 carbons of 12 or more (alternately 15 or more, alternately 16 or more); and/or
4) a run number of 2.6 or more (alternately 3.0 or more, alternately 3.4 or more); and/or
5) an average ethylene run length of 0.27 or more (alternately 0.28 or more, alternately 0.29 or more). Preferably when such ethylene copolymers (particularly, ethylene-hexene copolymers) are formed into compression molded films 3 mil thick, the films have one or more (preferably two or more, preferably three or more, preferably four or more, preferably five or more, preferably six or more, preferably seven or more, preferably eight or more, preferably all nine) of the following properties:
a) a Youngs Modulus of at least 215 MPa (alternately at least 230 MPa, alternately at least 260 MPa); and/or
b) a Tensile Stress at 100 percent Elongation of at least 10 MPa (alternately at least 11 MPa, alternately at least 12 MPa); and/or
c) a Tensile Stress of Y MPa or more, where Y=(0.0532)*Z−8.6733 and Z is the percent strain and is a number from 500 to 2000, preferably from 500 to 1000, preferably 500, 550, 600, 650, 700, 800, 850, 900, 950, or 1000, preferably 500, alternately Y=(0.0532)*Z−9.0, alternately Y=(0.0532)*Z−9.5; and/or
d) a ratio of tensile strength at break, in MPa, to tensile strength at 100% Elongation, in MPa, of 2.4 or more (preferably 2.5 or more, preferably 2.9 or more); and/or
e) an Ultimate Tensile Stress of at least 30 MPa (alternately at least 32 MPa, alternately at least 35 MPa); and/or
f) an Ultimate Tensile Strain of at least 750% (alternately at least 760%, alternately at least 768%); and/or
g) a ratio of Ultimate Tensile Strain to Ultimate Tensile Stress of about 17 or more (alternately 20 or more, alternately 21 or more); and/or
h) a 1% Secant Modulus of 30 to 100 MPa (alternately 35 to 90 MPa, alternately 40 to 85 MPa); and/or
i) a density of 0.910 to 0.945 g/cc (preferably from 0.920 to 0.940 g/cc, preferably from 0.921 to 0.935 g/cc, preferably from 0.917 to 0.918 g/cc).

This invention also relates to a polyethylene having comonomer (preferably hexene) present at about 3.4 mol % or more, an [HHH] triad content of 0.0006 mol % or more, an $r_1 r_2$ value of 1.27 or more, "butyls" per 1000 carbons of 16 or more, a run number of 3.3 or more (alternately 3.4 or more), an average ethylene run length of 0.29 or more at a $M_w$ of from about 10,000 to about 320,000 g/mol with an $M_w/M_n$ of from 2.5 to about 4.0, (preferably a density of 0.910 g/cm$^3$ or more and/or a 1% secant modulus of 30 to 100 MPa) where when the copolymer is formed into a compression molded film 3 mil thick, the film has: a Youngs Modulus of at least 260 MPa, a Tensile Stress at 100 percent Elongation of at least 12 MPa, a Tensile Stress of Y MPa or more, where Y=(0.0532)*Z−8.6733 and Z is the percent strain and is a number from 500 to 2000, preferably 500 to 1000, preferably 500, 550, 600, 650, 700, 800, 850, 900, 950, or 1000, preferably 500, a ratio of tensile strength at break, in MPa, to tensile strength at 100% Elongation, in MPa, of 2.9 or more, an Ultimate Tensile Stress of at least 35 MPa, an Ultimate Tensile Strain of at least 768%, and a ratio of Ultimate Tensile Strain to Ultimate Tensile Stress of about 21 or more.

This invention also relates to polyethylene films having at least one layer (preferably having multilayer polyethylene film having at least three layers) of the ethylene copolymer produced herein (preferably having any combination of the above properties), said copolymer having:
1) a melt index of (2.16 kg, 190° C.) 0.1 g/10 min to about 1.5 g/10 min (alternately from 0.2 g/10 min to 1.2 g/10 min, alternately preferably from 0.25 g/10 min to 1 g/10 min);
2) a density of 0.910 to 0.945 g/cc (preferably from 0.920 to 0.940 g/cc, preferably from 0.921 to 0.935 g/cc, preferably from 0.917 to 0.918 g/cc);
3) an Mw/Mn of greater than 1 to about 5 (preferably 1.5 to about 4, preferably 2 to 4, preferably 2.5 to 4);
where each layer may be the same or different ethylene polymer; and
wherein the film (when formed into a compression molded film) has:
a) a thickness of 70 to 100 microns (preferably 19 to 70 microns); and/or
b) a Youngs Modulus of at least 220 MPa, preferably of at least 240 MPa, more preferably of at least 260 MPa; and/or
c) a 1% Secant Modulus of 30 to 100 MPa, preferably of 35 to 90 MPa, more preferably of 40 to 85 MPa; and/or
d) a 2% Secant Modulus of at least 100 MPa; and/or
e) a Yield Stress of at least 12 MPa at an elongation of at least 10% strain, preferably of at least 25%, and more preferably of at least 70%; and/or
f) a Primary Yield Point of at least 12 MPa at an elongation of at least 15% strain, preferably of at least 18%; and/or
g) a Secondary Yield Point of at least 12 MPa at an elongation of at least 60% strain, preferably of at least 65%, and most preferably of at least 66%; and/or
h) a Tensile Stress at 100% Elongation of at least 12 MPa; and/or
i) a Tensile Stress at 200% Elongation of at least 12 MPa; and/or
j) a Tensile Stress at 300% Elongation of at least 13 MPa and preferably of at least 14 MPa; and/or
k) a Tensile Stress of Y MPa or more, where Y=(0.041)*Z−3.02, and Z is the percent strain and is a number from 500 to 2000, preferably 500 to 1000, preferably 500, 550, 600, 650, 700, 800, 850, 900, 950, or 1000, preferably 500 (Alternately Y=(0.041)*Z−3.5, alternately Y=(0.041)*Z−4.0); and/or l) a ratio of tensile strength at 500% elongation, in MPa, to tensile strength at yield, in MPa, of 1.3 or more, preferably 1.4 or more; and/or m) a ratio of tensile strength at 600% elongation, in MPa, to tensile strength at yield, in MPa, of 1.7 or more, preferably 1.8 or more; and/or n) a ratio of tensile strength at 700% elongation, in MPa, to tensile strength at yield, in MPa, of 2.1 or more, preferably 2.2 or more, preferably 2.3 or more; and/or o) a ratio of tensile strength at 800% elongation, in MPa, to tensile strength at yield, in MPa, of 2.4 or more, preferably 2.5 or more, preferably 2.9 or more; and/or p) a ratio of tensile strength at break, in MPa, to tensile strength at 100% Elongation, in MPa, of 2.9 or more; and/or q) a ratio of tensile strength at break, in MPa, to tensile strength at 300% Elongation, in MPa, of 2.5 or more; and/or r) a ratio of tensile strength at break, in MPa, to tensile strength at the Primary Yield Point, in MPa, of 2.9 or more; and/or s) an Ultimate Tensile Stress of at least 30 MPa, preferably of at least 35 MPa; and/or t) an Ultimate Tensile Strain of at least 700%, more preferably of at least 750% and most preferably of at least 768%; and/or u) an Ultimate Tensile Strain to Ultimate Tensile Stress ratio of about 21 or more.

In another embodiment, the film may have any combination of properties a) to u) above, including 1 to 21 of the properties, particularly, 1, 2, 3, 4, 5, 6, 7, 8, 9, 10, 11, 12, 13, 14, 15, 16, 17, 18, 19 20, or 21 of properties a) to u) above.

In a preferred embodiment, the ethylene polymer produced herein is an LLDPE (linear low density polyethylene) polymer having a density of 0.910 to 0.945 g/cc (preferably 0.920 to 0.940 g/cc). Preferably the LLDPE is produced using a hafnium metallocene catalyst as described below.

In another preferred embodiment, the ethylene copolymers (particularly, the ethylene-hexene copolymers) produced herein have: 1) a density in the range of from 0.910 to 0.945 g/cm$^3$, preferably in the range of from 0.920 to 0.940 g/cm$^3$, more preferably in the range of from 0.916 to 0.917 g/cm$^3$; 2) an Mw of from about 10,000 to about 500,000 g/mol, preferably from about 10,000 to about 3200,000 g/mol, preferably from about 20,000 to about 200,000 g/mol, or from about 25,000 to about 150,000 g/mol; 3) an $M_w/M_n$ of from about 1.5 to about 5, preferably from about 2.0 to about 4.0, preferably from about 3.0 to about 4.0 or from about 2.5 to about 4.0; 4) a melt index of from about 0.1 g/10 to about 1.5 g/10 min, preferably from about 0.2 to about 1.2 g/10 min and most preferably from about 0.25 to about 1 g/10 min; and 5) a melting point of about 115° C. to about 125° C., preferably from 115° C. to about 120° C. In another preferred embodiment, the ethylene copolymers (particularly, the ethylene-hexene copolymers) produced herein may also have: 1) a content of [HHH] triads of more than 0.0001 mol % or more, preferably more than 0.0004 mol %, preferably 0.0006 mol % or more; and/or 2) at least 1 mol % (preferably at least 3 mol %, preferably at least 7 mol %) comonomer (preferably $C_3$ to $C_{20}$, olefin, preferably $C_4$ to $C_{12}$ alpha-olefin, preferably hexene, octene, and/or butene) as determined by $^{13}C$ NMR; and/or 3) an $r_1r_2$ value of 1.0 or more (preferably greater than 1.1, preferably more than 1.2); and/or 4) "butyls" per 1000 carbons of 7 or more (preferably 12 or more, preferably 15 or more, preferably 16 or more); and/or 5) a run number of 1.6 or more (preferably 2.6 or more, preferably 3.4 or more, preferably 3.3 or more, preferably 3.4 or more); and/or 6) an average ethylene run length of 0.28 or more (preferably 0.29 or more).

In some embodiments, the polymers produced herein (preferably the LLDPE polymers) exhibit a Tm as measured by differential scanning calorimetry ("DSC") of from 90° C. or more, preferably from 100° C. to 200° C., alternately from about 90° C. to about 130° C.

In another embodiment, the polymers produced herein contain less than 5 ppm hafnium, generally less than 2 ppm hafnium, preferably less than 1.5 ppm hafnium, more preferably less than 1 ppm hafnium. In an embodiment, the polymer produced herein contains in the range of from about 0.01 ppm to about 2 ppm hafnium, preferably in the range of from about 0.01 ppm to about 1.5 ppm hafnium, more preferably in the range of from about 0.01 ppm to 1 or less ppm hafnium, as determined using ICPES (Inductively Coupled Plasma Emission Spectrometry).

In another preferred embodiment, compression molded films of the ethylene copolymers (particularly, the ethylene-hexene copolymers) produced herein preferably have: 1) a thickness of 70 to 100 microns (preferably 19 to 70 microns); and/or 2) a Youngs Modulus of at least 220 MPa, preferably of at least 240 MPa, more preferably of at least 260 MPa; and/or 3) a 1% Secant Modulus of 30 to 1000 MPa, preferably of 35 to 90 MPa, more preferably of 40 to 85 MPa; and/or 4) a 2% Secant Modulus of at least 100 MPa; and/or 5) a Yield Stress of at least 12 MPa at an elongation of at least 10% strain, preferably of at least 25%, and more preferably of at least 70%; and/or 6) a Primary Yield Point of at least 12 MPa at an elongation of at least 15% strain, preferably of at least 18%; and/or 7) a Secondary Yield Point of at least 12 MPa at an elongation of at least 60% strain, preferably of at least 65%, and most preferably of at least 66%; and/or 8) a Tensile Stress at 100% Elongation of at least 12 MPa; and/or 9) a Tensile Stress at 200% Elongation of at least 12 MPa; and/or 10) a Tensile Stress at 300% Elongation of at least 13 MPa and preferably of at least 14 MPa; and/or 11) a Tensile Stress of Y MPa or more, where Y=(0.041)*Z−3.02 and Z is the percent strain and is a number from 500 to 2000, preferably 500 to 1000, preferably 500, 550, 600, 650, 700, 800, 850, 900, 950, or 1000, preferably 500 (alternately Y=(0.041)*Z−3.5, alternately Y=(0.041)*Z−4.0); and/or 12) a ratio of tensile strength at 500% elongation, in MPa, to tensile strength at yield, in MPa, of 1.3 or more, preferably 1.4 or more, preferably 1.6 or more; and/or 13) a ratio of tensile strength at 600% elongation, in MPa, to tensile strength at yield, in MPa, of 1.7 or more, preferably 1.8 or more, and/or 14) a ratio of tensile strength at 700% elongation, in MPa, to tensile strength at yield, in MPa, of 2.1 or more, preferably 2.2 or more, preferably 2.3 or more; and/or 15) a ratio of tensile strength at 800% elongation, in MPa, to tensile strength at yield, in MPa, of 2.4 or more, preferably 2.5 or more, preferably 2.9 or more; and/or 16) a ratio of tensile strength at break, in MPa, to tensile strength at 100% Elongation, in MPa, of 2.9 or more; and/or 17) a ratio of tensile strength at break, in MPa, to tensile strength at 300% Elongation, in MPa, of 2.5 or more; and/or 18) a ratio of tensile strength at break, in MPa, to tensile strength at the Primary Yield Point, in MPa, of 2.9 or more; and/or 19) an Ultimate Tensile Stress of at least 30 MPa, preferably of at least 35 MPa; and/or 20) an Ultimate Tensile Strain of at least 700%, more preferably of at least 750% and most preferably of at least 768%; and/or 21) an Ultimate Tensile Strain to Ultimate Tensile Stress ratio of about 21 or more; and/or 22) a density of 0.910 to 0.945 g/cc (preferably from 0.920 to 0.940 g/cc, preferably from 0.921 to 0.935 g/cc, preferably from 0.917 to 0.918 g/cc).

In another embodiment, any of the copolymers produced herein may have a tensile strength at yield of greater than 11 MPa; and/or an ultimate elongation of greater than 750%; and/or an ultimate stress of less than 40 MPa; and/or an Ultimate strain to Ultimate stress ratio of greater than 17; and/or a 1% secant modulus of 30 to 100 MPa; and/or an intrinsic tear of 300 g/mil or less. (Intrinsic tear is measured on the compression molded sheet using the Elmendorf tear (type B) method as described in ASTM D-1922.)

Process and Catalyst

Figure 2:
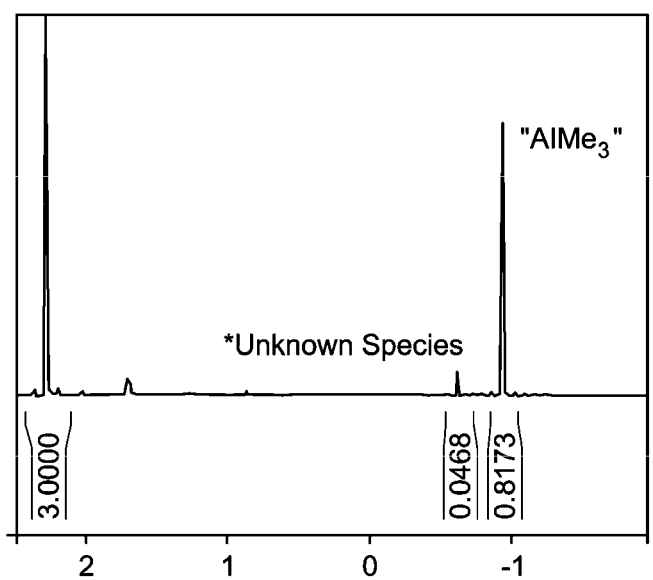
FIG. 2 is the baseline adjusted $^1$H NMR analysis of the MAO in FIG. 1 as calculated by Bruker XWIN-NMR version 2.1 software using the polynomial function.

It has been discovered herein that polymer microstructure, macrostructure, and film properties made from polymers produced and described herein can be specifically influenced by varying the amounts of trimethylaluminum (TMA) in a catalyst system containing methylalumoxane and metallocene transition metal compounds, preferably Hf transition metal compounds. In particular, we have found that by reducing the amount of TMA in a given system, preferably in addition to reducing the aluminum to transition metal ratio (preferably the Al/Hf ratio), one can favorably influence the comonomer incorporation and/or physical properties such as toughness. Specifically, we have also found that one can favorably influence the resin's polydispersity, intermolecular comonomer (such as hexene) distribution, the intramolecular comonomer (such as hexene) distribution, and the final film properties when the resin is converted into a film. Likewise, by altering the amount of an unknown species (presumably related to the TMA content in the MAO) one can also influence final polymer properties. This unknown species is detected in the $^1$H NMR spectra obtained of the methylalumoxane activator solution. Using the method disclosed in Organometallics, 1998, Vol. 17, No. 10, pp. 1941-1945 modified as described in the examples section below (for example, inter alia, $^1$Hydrogen frequency of 250 MHz, spectra obtained at room temperature, 60 seconds between pulses and signal averaging at least 8 transients, ICPES used for total Al content), three Al-Me species are distinguishable. A first broad signal due to oligomeric MAO is identified (for example, at from −0.2 to −1.2 ppm in FIG. 1). A second signal due to THF-complexed TMA is identified within the broad MAO signal (for example, at about −0.9 ppm in FIG. 1) and a third smaller up-field peak is identified within the broad MAO signal (for example, at about −0.55 ppm in FIG. 1). This third peak is referred to herein as the unknown species, unknown peak, or the unknown formula. Representative $^1$H NMR spectra illustrating these signals are shown in FIGS. 1 and 2. The proton shifts are assigned based on referencing the residual downfield peak in deuterated THF as 3.58 ppm. While individual spectra may not resolve at the specific points shown in FIG. 1, the broad MAO range will contain the downfield THF complexed TMA peak and an upheld unknown peak. The integration units of the unknown species are defined on the basis of the TMA peak being normalized to 3.0 integration units.

Hence, in a preferred embodiment, a low aluminum to transition metal molar ratio (preferably a low Al/Hf molar ratio) is useful herein, such as an aluminum to transition metal molar ratio (preferably an Al/Hf molar ratio) of 175 or less, preferably 155 or less, preferably 150 or less, preferably 125 or less. Alternately, the Al/Hf ratio is from 75:1 to 175:1, preferably 100:1 to 175:1.

Alternately, in a preferred embodiment, the unknown species is present in the catalyst system (prior to being combined with any support) at 0.10 to 1.0, preferably 0.10 to 0.65 integration units, as measured by $^1$H NMR.

Alternately, in a preferred embodiment, trimethylaluminum is present in the catalyst system (prior to being combined with any support) at 1 to 25 mol %, preferably 6 to 25 mol %, preferably 8 to 20 mol %, preferably 9 to 18 mol %, as measured by $^1$H NMR. Alternately, in a preferred embodiment, trimethylaluminum is present in the catalyst system (prior to being combined with any support) at 1 to 18 wt %, preferably 4 to 18 wt %, preferably 6 to 14 wt %, preferably 7 to 13 wt %, as measured by $^1$H NMR. Alternately, in a preferred embodiment, trimethylaluminum is present in the catalyst system (prior to being combined with any support) at 1 to 25 wt %, preferably 6 to 25 wt %, preferably 8 to 20 wt %, preferably 9 to 18 wt %, as measured by $^1$H NMR. Proton ($^1$H) NMR data for catalyst systems is obtained using the method disclosed in Organometallics, 1998, Vol. 17, No. 10, pp. 1941-1945 modified as described in the examples section below (inter alia, spectra obtained at room temperature, 60 seconds between pulses and signal averaging at least 8 transients, ICPES to determine total Al content). Weight % TMA in a catalyst system is determined by the $^1$H NMR method above and is based upon the weight of the catalyst system without any support and not including the weight of any solvent. Mol % TMA in a catalyst system is determined using the $^1$H NMR method above and is based upon the moles of catalyst system components present (not including support and solvent). For all purposes of this invention and the claims thereto, the Mw of methylalumoxane is presumed to be 60.804 g/mol. This number was derived from a formula for MAO of $(AlO_8(CH_3)_{1.4})_x$ ("The unit formula that fits all the data had a ratio of about 1.4:1:0.8 for methyls, aluminum and oxygen respectively.") as described in Organometallics, 1998, Vol. 17, No. 10, pp. 1941-1945 at page 1944.

Alternately, in a preferred embodiment, the trimethylaluminum present in a methylalumoxane solution is adjusted to be from 1 to 25 mol % (preferably 6 to 25 mol %, preferably 8 to 20 mol %, preferably 9 to 18 mol %), prior to use as an activator, where the mol % trimethylaluminum is determined by $^1$H NMR of the MAO solution prior to combination with any support (Proton ($^1$H) NMR data is obtained using the method disclosed in Organometallics, 1998, Vol. 17, No. 10, pp. 1941-1945 modified as described in the examples section below (inter alia, spectra obtained at room temperature, 60 seconds between pulses and signal averaging at least 8 transients, and ICPES to determine total Al content). Alternately, in a preferred embodiment, the trimethylaluminum present in a MAO solution is adjusted to be 1 to 18 wt %, preferably 4 to 18 wt %, preferably 6 to 14 wt %, preferably 7 to 13 wt %, as measured by $^1$H NMR (as described above). Alternately, in a preferred embodiment, the trimethylaluminum in a MAO solution is adjusted to be 1 to 25 wt %, preferably 6 to 25 wt %, preferably 8 to 20 wt %, preferably 9 to 18 wt %, as measured by $^1$H NMR. The $^1$H NMR data is obtained as described above. Weight % TMA in a MAO solution is based upon the weight of the aluminum-methyl species and solvent without any support. Mol % TMA in a MAO solution is based upon the moles of the aluminum-methyl species and solvent without any support using an Mw for MAO of 60.804 g/mol. For all purposes in this invention and the claims thereto, the unknown species is regarded to be an aluminum-methyl species.

In another embodiment, wt % of TMA as total aluminum-methyl species in the MAO solution is preferably from 0.5 to 60 wt %, preferably 1 to 50 wt %, preferably 3 to 40 wt %, preferably 5 to 30 wt %. The wt % of TMA as total aluminum-methyl species in MAO solutions (also referred to as "wt % of TMA as total Al" or "TMA as Al") is quantitatively determined by $^1$H NMR as described in the method disclosed in Organometallics, 1998, Vol. 17, No. 10, pp. 1941-1945 modified as described in the examples section below (inter alia, spectra obtained at room temperature, 60 seconds between pulses and signal averaging at least 8 transients, and ICPES to determine total Al content). The value obtained for the wt % TMA as Al is also the mol % TMA as Al, e.g. the mol % of the TMA present in the aluminum methyl species. Likewise, in another embodiment, wt % of MAO as total aluminum-methyl species in the MAO solution is preferably from 40 to 99.5 wt %, preferably 50 to 99 wt %, preferably 60 to 97 wt %, preferably 70 to 95 wt %. The wt % MAO as total aluminum-methyl species in MAO solutions (also referred to as "wt % of MAO as total Al" or "MAO as Al") is quantitatively determined by $^1$H NMR as described in the method disclosed in Organometallics, 1998, Vol. 17, No. 10, pp. 1941-1945 modified as described in the examples section below (inter alia, spectra obtained at room temperature, 60 seconds between pulses and signal averaging at least 8 transients, and ICPES to determine total Al content). The value obtained for the wt % MAO as Al is also the mol % MAO as Al, e.g. the mol % of the MAO present in the aluminum methyl species.

Alternately in any embodiment described herein, at least 2 mol % methyl alumoxane is present in the methylalumoxane solution, preferably at least 5 mol %, preferably at least 10 mol %, preferably from 2 to 99 mol %, preferably from 5 to 80 mol %, based upon the mol % of the aluminum-methyl species and the solvent. Mol % MAO is determined by $^1$H NMR using the method disclosed in Organometallics, 1998, Vol. 17, No. 10, pp. 1941-1945 modified as described in the examples section below (inter alia, spectra obtained at room temperature, 60 seconds between pulses and signal averaging at least 8 transients, and ICPES to determine total Al content).

In a particularly preferred embodiment, the low Al/Hf ratios are used in combination with TMA concentrations in the catalyst system (prior to being combined with any support) of 6 to 25 mol %, preferably 8 to 20 mol %, preferably 9 to 18 mol %, as measured by $^1$H NMR.

In another embodiment, the ratio of wt % TMA as Al to wt % MAO as Al in the MAO solution is preferably from 0.001:1 to 1,000:1, preferably 1:100, preferably 1:10.

In a particularly preferred embodiment, the low Al/Hf ratios are used in combination with TMA concentrations in the catalyst system (prior to being combined with any support) of 1 to 25 wt %, preferably 6 to 25 wt %, preferably 8 to 20 wt %, preferably 9 to 18 wt %, as measured by $^1$H NMR as described herein.

In a particularly preferred embodiment, an Al/Hf ratio of 175 or less (preferably 155 or less, preferably 150 or less, preferably 125 or less, preferably 115 or less, preferably 112 or less, preferably 110 or less (alternately the Al/Hf ratio is from 75:1 to 175:1, preferably 100:1 to 175:1), is used in combination with: 1) an unknown species presence in the catalyst system (prior to being combined with any support) at 0.10 to 0.65 integration units; and 2) a TMA concentration in the catalyst system (prior to being combined with any support) of 1 to 25 mol %, (preferably 6 to 25 mol %, preferably 8 to 20 mol %, preferably 9 to 18 mol %) or alternately a TMA concentration in the catalyst system (prior to being combined with any support) of 1 to 25 wt %, preferably 6 to 25 wt % (preferably 8 to 20 wt %, preferably 9 to 18 wt %), based upon the weight of the catalyst system.

Varying the catalyst systems' composition, typically prior to deposition on the support, as described herein controls the intermolecular and intramolecular comonomer (preferably hexene) distributions in copolymers (preferably ethylene copolymers). Surprisingly, the copolymer's [HHH] triad content increases with an increase in the amount of an unidentified species (or decrease in amount of TMA) detected by $^1$H NMR (see FIGS. 1 and 2) in the catalyst system prior to being deposited on silica.

Surprisingly, the polymer's polydispersity (Mw/Mn) decreases with an increase in the amount of an unidentified species detected by $^1$H NMR in the catalyst system prior to being deposited on a support, such as silica.

This invention also relates to a method to produce block copolymers comprising adjusting, preferably adjusting online, the amount of trimethyl aluminum in a methylalumoxane solution prior to use, preferably in a continuous process, as an activator to obtain comonomer triad [HHH] fractions in the different segments (also referred to as blocks) that differ by at least 5% relative to each other (preferably by at least 10%, preferably at least 15%, preferably at least 20%, preferably at least 30%, preferably at least 50%, preferably at least 75%, preferably at least 100%, preferably at least 250%, preferably at least 500%). Differences in segments are confirmed by subjecting the polymer to preparative TREF (as set out herein), selecting the TREF fraction corresponding to the Mw as measured by GPC for the whole polymer, measuring the Mw, Mn, Mz, mol % comonomer, and triad fractions (such as [HHH] fraction) for the TREF fraction, then subjecting the polymer fraction to acid etching (using nitric acid oxidation according to the procedure in P. Palmer and A. J. Cobbold, *Makromol Chemie* 74, pg. 174-189 (1964), except that the sample is treated for 48 hours), measuring the Mw, Mn, Mz, mol % comonomer, and triad fractions (such as [HHH] fraction) for the acid treated TREF fraction, then comparing the measuring the Mw, Mn, Mz mol % comonomer, and triad fractions (such as [HHH] fraction) for the TREF fraction of the untreated fraction to the acid treated fraction.

The hexene distribution in the polymers made with lower Hf loading and lower TMA content is blockier, as evidenced by a [HHH] triad content that is twice that of a reference resin (see catalyst 39 in the Example section) and an r1r2 value (1.27) greater than that of the reference resin (1.04).

The polymers produced herein also have a different distribution of TREF fractions corresponding to high, medium and low density components with peak elute temperatures occurring at temperatures of 68° C. to 70° C., 84° C., and 90° C., respectively (see the Example section and Preparative TREF description for more information on how to obtain the TREF fractions).

It has also been discovered that decreasing the catalyst system's hafnium loading increases the amount of lower density component in the polymer.

Figure 3:
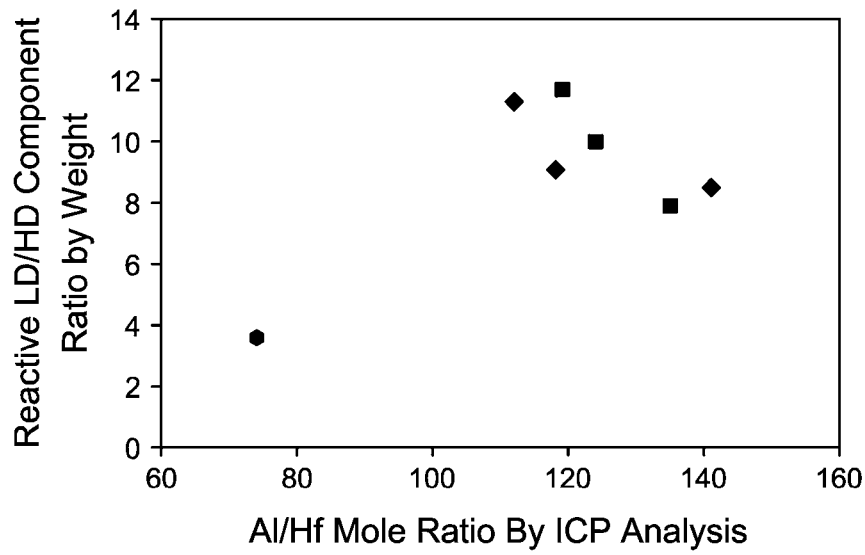
FIG. 3 is a graph of the ratio of the relative low density component's loading to the higher density component's loading as a function of the amount of hafnium in the catalyst at different Al/Hf mol ratios. The hexagon is Example 44.
Figure 4:
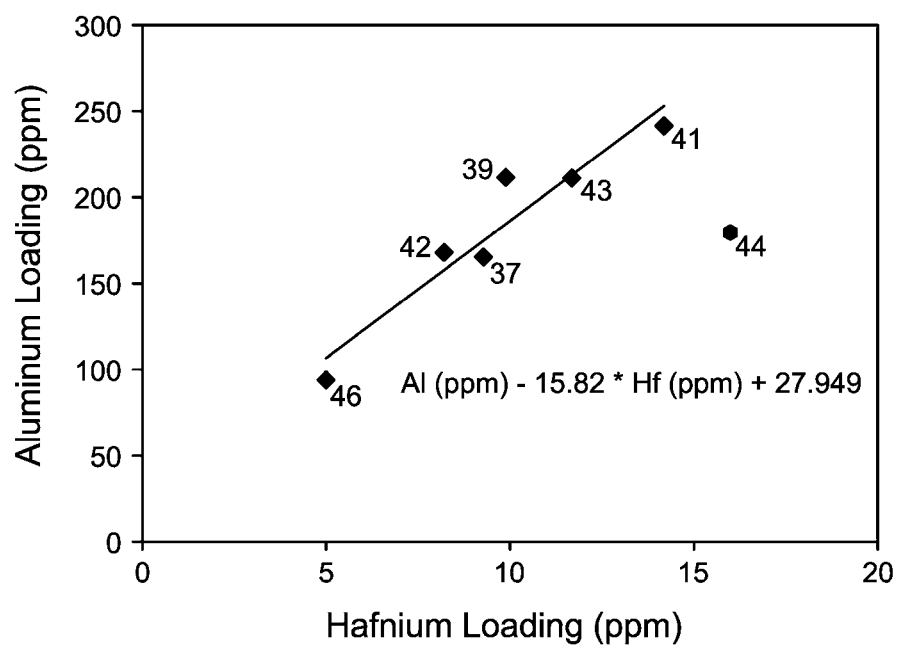
FIG. 4 is a graph showing the aluminum loading versus the hafnium loading. The hexagon is Example 44.
Figure 5:
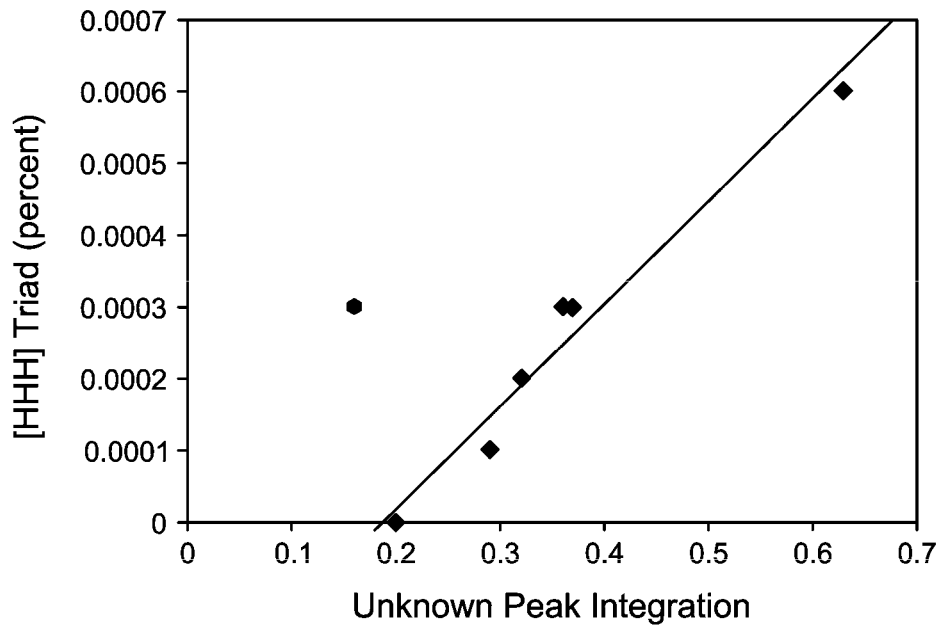
FIG. 5 is the [HHH] triad loading versus the amount of an unknown species in the catalyst. The [HHH] triad loading increases with an increase for unknown species in the catalyst. The hexagon is Example 39.
Figure 6:
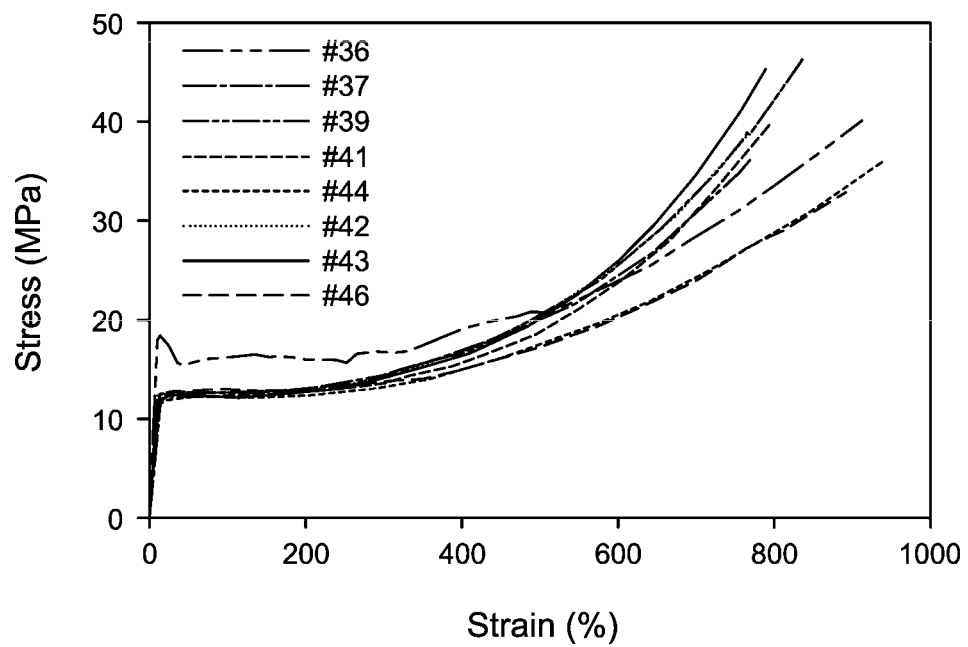
FIG. 6 is a graph of the tensile curves for compression molded films of the copolymers prepared herein.
Figure 7:
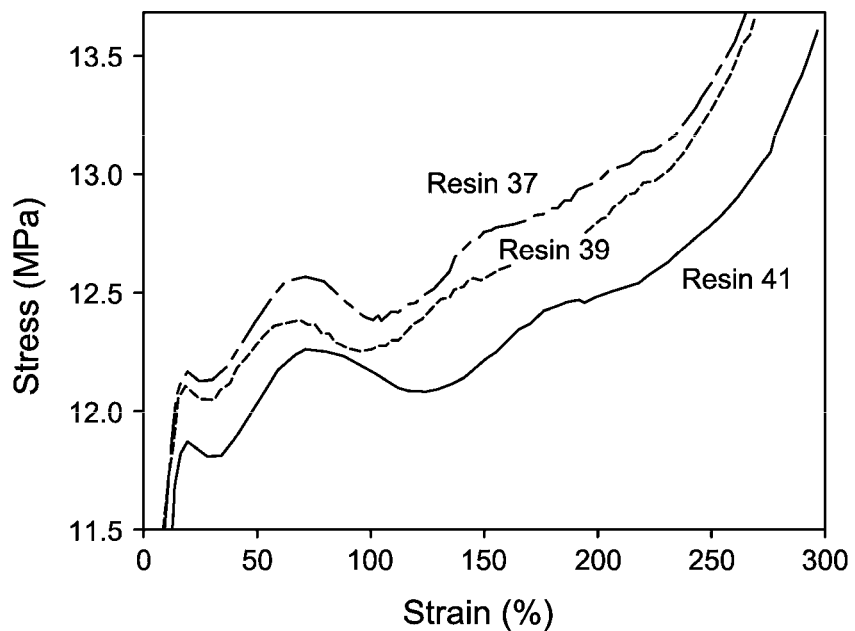
FIG. 7 is the tensile curves at up to 300% elongation of the compression-molded films made from the copolymers produced using catalysts 37, 39 and 41 at reduced hydrogen loadings.

FIG. 3 shows the ratio of the wt %'s of the lower density component (peak elute temperatures occurring at temperatures of 68° C. to 70° C.) to higher density component (peak elute temperatures occurring at temperatures of 90° C.) components in the resins increases with a decrease in the Al/Hf ratio employed.

Figure 8:
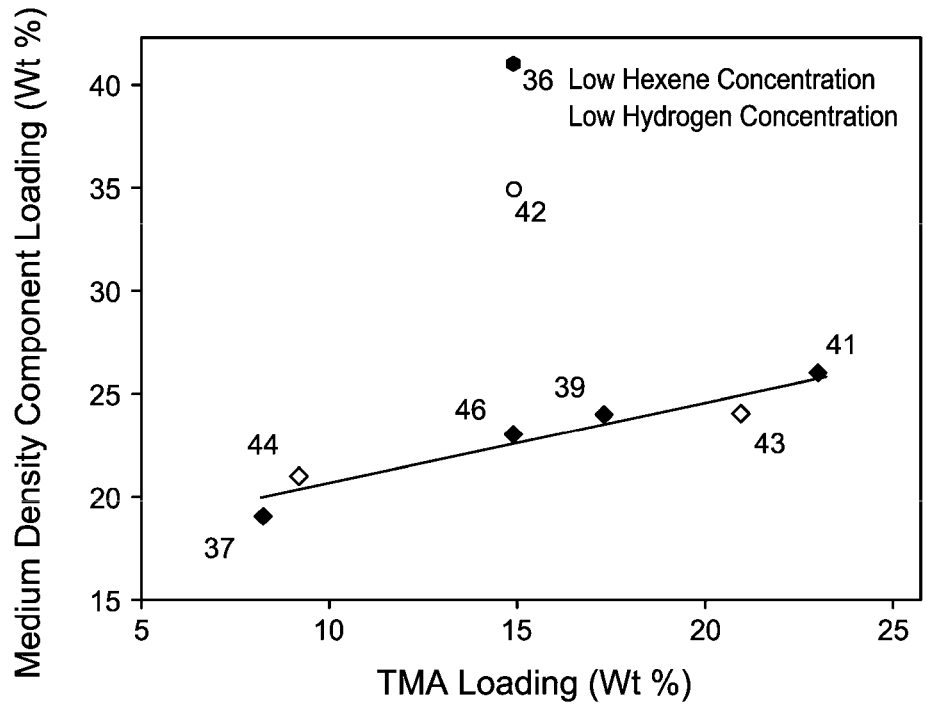
FIG. 8 is a graph of medium density component loading versus TMA loading.

Likewise, it has been noted that decreasing the TMA loading decreased the wt % of the medium density materials in the product resins. For example, the exceptionally high loading of the medium density materials in the Resin 42 (see Example section below) was surprising, see FIG. 8. Resin 36 in FIG. 8 was produced at the start of the campaign and thus is thought to have been produced in an unstable system, perhaps with much lower hexene and/or hydrogen concentration. Thus, in another embodiment, the polymer produced herein has a content of Medium Density Component (wt %, based upon the weight of the whole polymer) less than or equal to 0.3918* (TMA loading wt %, based upon the weight of the solvent, catalyst compound and TMA)+16.722.

Figure 9:
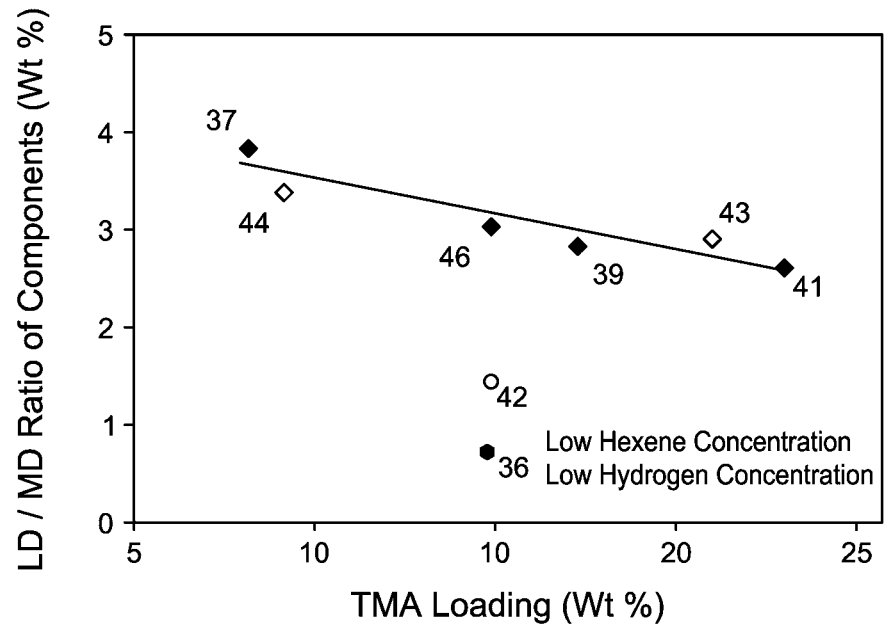
FIG. 9 is a graph of lower density/medium density ratio versus TMA loading.

Likewise, it has been noted that decreasing the TMA loading increased the amount of lower density materials in the resins. (See FIG. 9.) Thus, in another embodiment, ratio of loading of Lower Density Component to Medium Density Component (wt %, based upon the weight of the whole polymer) is greater than or equal to −0.067*(TMA Loading wt %, based upon the weight of the solvent, catalyst compound and TMA)+4.152.

It has also been noted that the mol % [HHH] triad in the polymer increases with an increase in the amount of the unknown species—in the catalyst system prior to contact with the support, as determined by $^1$H NMR. This relationship can be represented by the equation: HHH Triad Loading (in mol fraction) is greater than or equal to 0.0014*(Unknown Peak in Integration units)−0.0002.

Figure 10:
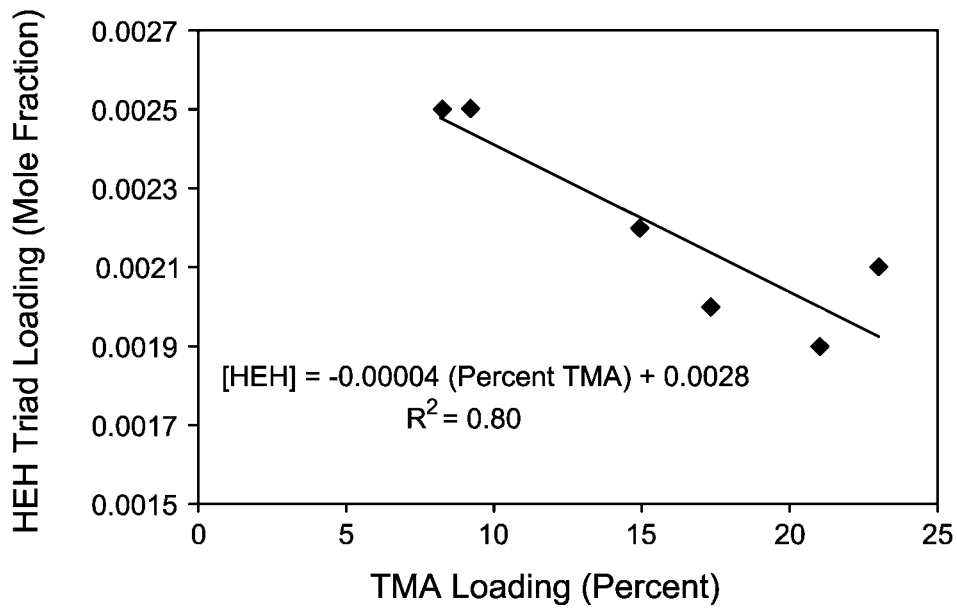
FIG. 10 is a graph of [HEH] triad loading versus TMA loading.
Figure 11:
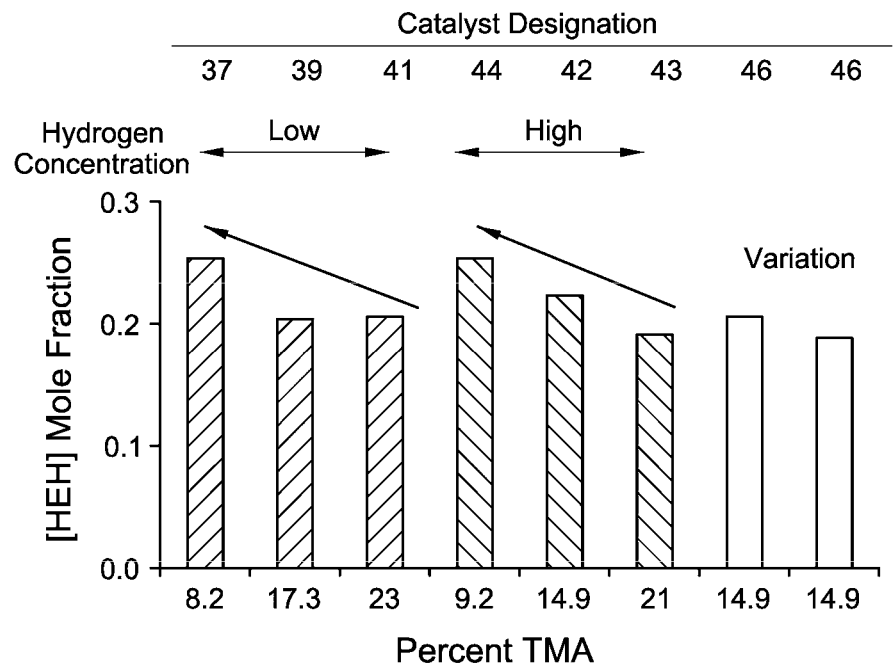
FIG. 11 is a graph of [HEH] mol fraction versus TMA (%) arranged by hydrogen content.

It has also been noted that the polymer's [HEH] triad loading increases with a decrease in the catalyst's TMA loading. (See FIG. 10.)

Figure 12:
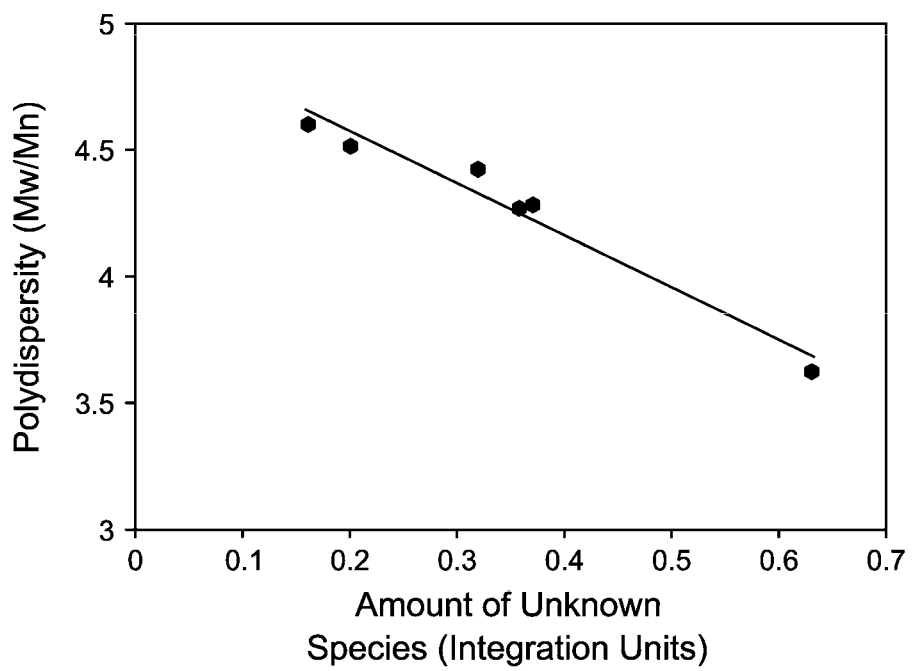
FIG. 12 is a graph of Mw/Mn versus amount of unknown species.

It has also been noted that the polymer's Mw/Mn decreases with an increase in the amount of the unknown species in the catalyst system prior to combination with a support, as determined by $^1$H NMR. This relationship can be represented by the equation:

$$Mw/Mn \leq -2.0508*(\text{Unknown Peak in Integration units})+4.9873. \text{ (See FIG. 12.)}$$

The inventors have also noted that the film performance (specifically the tear resistance and impact resistance) of ethylene copolymers produced according to the process described herein can be improved by decreasing the amount of TMA in the catalyst system. See the Examples which show reduced TMA to about to 2.4 percent by weight.

This invention relates to a process for polymerizing olefins in which the amount of trimethylaluminum in a methylalumoxane solution is adjusted to be from 1 to 25 mol % (preferably 6 to 25 mol %, preferably 8 to 20 mol %, preferably 9 to 18 mol %), prior to use as an activator, where the mol % TMA is determined by $^1$H NMR of the solution prior to combination with any support.

Alternately, this invention relates to a process for polymerizing olefins in which the amount of trimethylaluminum in catalyst system comprising methylalumoxane and a metallocene transition metal compounds is adjusted to be from 6 to 25 mol % (preferably 8 to 20 mol %, preferably 9 to 18 mol %), prior to use as an activator, where the mol % TMA is determined by $^1$H NMR of the catalyst system prior to combination with any support.

In another embodiment, this invention relates to a process for polymerizing olefins in which the amount of an unknown species present in a methylalumoxane solution is adjusted to be from 0.10 to 1.0 integration units (preferably 0.10 to 0.85 integration units, preferably 0.10 to 0.65 integration units), prior to use as an activator, where the amount of unknown species is determined by $^1$H NMR of the solution performed prior to combination with any support.

In another embodiment, this invention relates to a process for polymerizing olefins in which the amount of an unknown species present in catalyst system comprising methylalumoxane solution and a metallocene transition metal compounds, is adjusted to be from 0.10 to 1.0 integration units (preferably 0.10 to 0.85 integration units, preferably 0.10 to 0.65 integration units), prior to use as an activator, where the amount of unknown species is determined by $^1$H NMR of the solution performed prior to combination with any support.

Thus, in another preferred embodiment, this invention relates to a process to control comonomer distribution (such as [HHH] triad distribution) comprising:

1) contacting a catalyst compound represented by the formula:

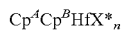

$Cp^A Cp^B HfX*_n$ wherein each X* and each Cp group is chemically bonded to Hf; n is 0, 1, 2, 3, or 4; X* is a leaving group (such as an alkyl or a halide); $Cp^A$ and $Cp^B$ may be the same or different cyclopentadienyl ligands or ligands isolobal to cyclopentadienyl, either or both of which may contain heteroatoms and either or both of which may be substituted with methylalumoxane and trimethylaluminum to form a catalyst system having an Al/Hf ratio of 175 or less and 6 to 25 mol % trimethylaluminum, where when the catalyst system, prior to being combined with a support, is subjected to $^1$H NMR a peak representing the unknown species is present in an amount of 0.10 to 1.0 integration units (preferably 0.10 to 0.65 integration units);

2) optionally combining the catalyst system with a support;
3) contacting the catalyst system with two or more different olefins (e.g., differ by at least one carbon); and
4) obtaining polymer.

In another embodiment, this invention relates to the use of TMA concentration to control for technical effect, specifically of controlling comonomer distribution and volume of TREF fractions eluting at 84° C., 90° C., and 68° C. to 70° C.

In another embodiment, the above can be used in a continuous system, where, prior to introduction into a polymerization reactor, the catalyst system is tested to determine TMA content and/or unknown peak amount, and/or Al/Hf ratio, and thereafter the composition of the catalyst system is altered prior to injection into a polymerization reactor.

In another embodiment, the above can be used in a continuous system, where, prior to introduction into a polymerization reactor, the catalyst system is tested to determine TMA content and/or unknown peak amount, and/or Al/Hf ratio, and thereafter the composition of the catalyst system is altered to influence polymer properties.

In another embodiment, the above can be used in a continuous system, where a polymer exiting a reactor is tested to determine a property, such as comonomer distribution or volume of TREF fractions eluting at 84° C., 90° C., and 68° C. to 70° C., and then the TMA content and/or unknown peak amount is altered (typically in the MAO solution or the catalyst system), prior to introduction into a polymerization reactor.

To determine what levels of TMA are desirable for a specific system or polymer, one may perform standard polymerizations, as follows. To begin, a solution of alumoxane (such as methyl alumoxane), 30 wt % in toluene, is prepared and the aluminum alkyl (such as TMA in the case of MAO) is removed from the solution (for example, by combination with trimethylphenol and filtration of the solid). Thereafter the metallocene catalyst compound of interest is added (hereinafter "Solution A"). Thereafter multiple supported catalyst systems comprising metallocene, alumoxane, and aluminum alkyl (e.g., MAO and TMA) are prepared from Solution A. The first supported catalyst system is prepared by adding enough aluminum alkyl to an aliquot of Solution A to make a supported catalyst having 0.5 mol % aluminum alkyl present in the catalyst system prior to addition to the support. The next supported catalyst systems are prepared by adding enough aluminum alkyl to an aliquot of Solution A to make a catalyst system having 1.0 mol % aluminum alkyl present in the catalyst system prior to supportation, and so on, progressing by 0.5 mol % increments to 50 mol % aluminum alkyl present in the catalyst system prior to supportation. It is important that the solutions are prepared and dried in the same manner to prepare the supported catalyst system. The supported catalyst systems (including a supported Solution A) are then each introduced into a polymerization reactor with the olefin monomers of interest (such as ethylene and 10 mol % hexene), keeping in mind that the catalyst system delivery method, polymerization conditions, monomer concentrations, hydrogen concentrations (and all other concentrations of materials present in the polymerization), and quench conditions should be the same. The polymers produced are then tested for a property of interest. The property is then graphed versus the mol % aluminum alkyl (mol % aluminum alkyl on the abscissa and property on the ordinate) to select the desired TMA levels for a given system. The same method can be used for the level of unknown species in a system.

Adjustment of the amount of alkyl aluminum (typically TMA) in the alumoxane solution or catalyst system can be achieved by adding or removing ("removing" is defined to include preventing the TMA from influencing the polymerization, not just physically removing the TMA) alkyl aluminum (preferably TMA) to or from the catalyst system. One means to remove alkyl aluminum (preferably TMA) is to contact the solution with an alcohol (such as triphenyl methanol) and then filter the solids from the solution. This is typically done with the alumoxane solution prior to addition of the catalyst compound. For example, one would begin with a solution of alumoxane (such as methyl alumoxane (MAO), typically obtained from Albemarle), 30 wt % in toluene. Generally, commercially available MAO contains some level of TMA. The TMA level in a sample can be increased by addition of measured amount(s) of neat TMA (Aldrich, 99%). The TMA level is decreased by the reaction of original MAO with a measured amount of $Ph_3COH$, followed by filtration of the white precipitate (which is thought to be some complex of $Ph_3COH$ with TMA, assuming that one molecule of $Ph_3COH$ removes one molecule of TMA). The solid is insoluble in toluene and is typically filtered from the MAO solution before using in supportation.

Alternately, adjustment of the amount of alkyl aluminum (typically TMA) available to influence the polymerization in the alumoxane solution or catalyst system can be achieved by adding one or more Bronsted acids to the solution. Useful Bronsted acids include phenolics, amines, phosphites, and the like, which are often used as antioxidants in polymer production and processing. Preferred Bronsted acids include hindered phenolics, such as IRGANOX™ 1010 or IRGANOX™ 1076 (available from Ciba-Geigy); phosphites (e.g., IRGAFOS™ 168 available from Ciba-Geigy); alkali metal and glycerol stearates; anti-static agents, and the like. Particularly useful Bronsted acids include: butylated hydroxy toluene, tris(2,4-di-tert-butylphenyl)phosphite (IRGAFOS 168), di(2,4-di-tert-butylphenyl)pentaerithritol diphosphite (ULTRANOX 626), poly[2-N,N'-di(2,2,6,6-tetramethyl-4-piperidinyl)-hexanediamine-4-(1-amino-1,1,3,3-tetramethylbutane)sym-triazine] (CHIMASORB 944); bis(1,2,2,6,6-pentamethyl-4-piperidyl)sebacate (TINUVIN 770), pentaerythrityl tetrakis(3,5-di-tert-butyl-4-hydroxyphenyl) propionate (IRGANOX 1010); Octadecyl-3-(3,5-di-tert-butyl-4-hydroxyphenyl)-propionate (IRGANOX 1076); and 1,3,5-Tri(3,5-di-tert-butyl-4-hydroxybenzyl-isocyanurate (IRGANOX 3114).

The Bronsted acids may be present in any effective amounts, such as 0.001 to 10 wt %, alternately 0.005 to 2 wt %, based upon the weight of the catalyst/MAO/TMA solution entering the reactor.

In another embodiment, pyridine or pyridine derivatives are added to the solution to adjust the amount of alkyl aluminum and may be present in any effective amounts, such as 0.001 to 10 wt %, alternately 0.005 to 2 wt %, based upon the weight of the catalyst/MAO/TMA solution entering the reactor.

In a preferred embodiment, the TMA is added intermittently to the methylalumoxane solution before or after combination with a catalyst compound, preferably the TMA is adjusted by adding a Bronsted Acid to the methylalumoxane solution before or after combination with a catalyst compound. Alternately, two or more MAO solutions (typically with different TMA concentrations) can be used to adjust the TMA content in the final catalyst system). For example, two MAO solutions having different TMA concentrations can be injected at different locations or times in the catalyst activation sequence. Pulsing such MAO solutions into the catalyst feed stream, for example, could create the ability to modify the final product accordingly. Alternately, one could have two or more catalyst system injection ports where each port may introduce the same or different amount of TMA in the catalyst system.

The inventors have found that altering the amount of TMA present (or available to influence the polymerization) can alter the comonomer concentration and distribution in the polymer product.

In another embodiment, this invention relates to a method to alter composition distribution in a copolymer "on-line" by altering the amount of alkyl aluminum coactivator present on the supported catalyst system.

In a particularly preferred embodiment, the amount of the unknown peak in the catalyst system prior to supportation is altered by adding or subtracting TMA.

In a preferred embodiment, in the above processes, the polymerization process is a gas phase or slurry phase process.

Catalyst

Catalysts, useful herein, include metallocene transition metal compounds, which are defined to be transition metal (preferably group 4) compounds represented by the formula:

$$L_2MX_n$$

where M is a transition metal, preferably a group 4, 5, or 6 metal, preferably a group 4 metal, preferably Hf, Zr, or Ti; X is a leaving group (such as halogen or alkyl, such as chloride or methyl); and each L group is a heteroatom containing group, or a substituted or unsubstituted cyclopentadienyl, indenyl or fluorenyl group, preferably both L groups are the same or different substituted or unsubstituted cyclopentadienyl, indenyl or fluorenyl group.

Suitable catalysts for making the polymers described herein (preferably LLDPE polymers) include hafnium transition metal metallocene-type catalyst systems for polymerizing one or more olefins represented by the formula:

$$Cp^A Cp^B HfX^*_n$$

wherein each $X^*$ is chemically bonded to Hf; $X^*$ is a leaving group (such as a $C_1$ to $C_{40}$ hydrocarbyl or halide, preferably methyl, ethyl, propyl, butyl, chloride and bromide); each Cp group is chemically bonded to Hf; and n is 0, 1, 2, 3, or 4. Preferably, n is 1 or 2. The ligands represented by $Cp^A$ and $Cp^B$ may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ may be unsubstituted or substituted with any one or combination of substituent groups R. Non-limiting examples of substituent groups R include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. Particularly preferred $Cp^A$ and $Cp^B$ groups may, independently, be n-propylcyclopentadienyl, n-butyl-cyclopentadienyl, n-hexyl-cyclopentadienyl, n-octyl-cyclopentadienyl, n-decyl-cyclopentadienyl, n-dodecyl-cyclopentadienyl, $(CpMe_xPrH_y,$ where x+y=4), $(CpMe_4Pr)$, $(Cpn-BuMeH_3)$, $(CpPrMeH_3)$, $(CpPrMe_3H)$, where Cp=cyclopentadienyl, Me=methyl, =Pr=propyl, and n-Bu is n-butyl. Preferred $Cp^A$ and $Cp^B$ groups may, independently, be n-alkyl-Cp, where the "n-alkyl" is preferably a $C_2$ to $C_{12}$ alkyl, preferably propyl, butyl, hexyl, octyl, decyl, or dodecyl.

In a particularly preferred embodiment, both $Cp^A$ and $Cp^B$ are substituted with an alkyl group (preferably an n-propyl group) at any position on the ring. A particularly preferred catalyst compound, useful herein, is a bis(n-$C_{3-4}$ alkyl cyclopentadienyl)hafnium dialkyl or dihalide, preferably bis(n-propyl cyclopentadienyl)hafnium dichloride or bis(n-propyl cyclopentadienyl)hafnium dimethyl.

In particularly preferred embodiments, both $Cp^A$ and $Cp^B$ are bridged via a bridging group A, where A is selected from $R'_2C$, $R'_2Si$, $R'_2Ge$, $R'_2CCR'_2$, $R'_2CCR'_2CR'_2$, R'C=CR', R'C=CR'CR'_2, $R'_2CSiR'_2$, $R'_2SiSiR'_2$, $R'_2CSiR'_2CR'_2$, $R'_2SiCR'_2SiR'_2$, R'C=CR'SiR'_2, $R'_2CGeR'_2$, $R'_2GeGeR'_2$, $R'_2CGeR'_2CR'_2$, $R'_2GeCR'_2GeR'_2$, $R'_2SiGeR'_2$, R'C=CR'GeR'_2, R'B, $R'_2C$—BR', $R'_2C$—BR'—$CR'_2$, R'N, $R'_2C$—NR', $R'_2C$—NR'—$CR'_2$, R'P, $R'_2C$—PR', and $R'_2C$—PR'—$CR'_2$ where R' is, independently, hydrogen, hydrocarbyl (preferably $C_1$ to $C_{12}$ alkyl or $C_1$ to $C_{12}$ aryl), substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent; preferably A is one of the compounds listed as "Y" in Table 1 (beginning at column 23) of U.S. Pat. No. 7,276,567, more preferably A is selected from the group consisting of dimethylsilylene, diethylsilylene, dipropylsilylene, diphenylsilylene, dimethylgermylene, diethylgermylene, diphenylgermylene, methylene, dimethylmethylene, diethylmethylene, dibutylmethylene, dipropylmethylene, diphenylmethylene, ditolylmethylene, di(butylphenyl)methylene, di(trimethylsilylphenyl)-methylene, di(trimethylsilylphenyl)-silylene, di(triethylsilylphenyl)-methylene, di(triethylsilylphenyl)-silylene, dibenzylsilylene, and dibenzylmethylene. Even more preferably, A is selected from dimethylsilylene, di(trimethylsilylphenyl)-methylene, dialkylgermylene, dialkylsilylene (where the alkyl is a $C_2$ to $C_{40}$ substituted or unsubstituted alkyl group), cycloalkylsilyl, and cycloalkylsilyl (where the cycloalkyl is a $C_2$ to $C_{40}$ substituted or unsubstituted cycloalkyl group).

Exemplary hafnocene catalyst systems used to produce LLDPEs (particularly, the ethylene-hexene copolymers), useful herein, are set forth in the description and examples of U.S. Pat. Nos. 6,936,675 and 6,528,597, both of which are fully incorporated herein by reference. Particularly preferred catalysts include bis(n-propyl cyclopentadienyl)hafnium di-halide (preferably bromide, chloride or fluoride, alternately preferably chloride or fluoride, preferably fluoride). Additionally useful catalysts include bis(n-propyl cyclopentadienyl)hafnium di-halide di-alkyl (preferably methyl, ethyl, or propyl). In some embodiments the dialkyl group is converted to a dihalide prior to use as a polymerization catalyst.

In a preferred embodiment, the polyethylene prepared herein is produced by polymerization of ethylene and, optionally, an alpha-olefin (preferably hexene) with a catalyst having as a transition metal component a bis(n-$C_{3-4}$ alkyl cyclopentadienyl)hafnium compound (where the alkyl is preferably propyl or butyl), wherein the transition metal component comprises from about 95 to about 99 mol % of the hafnium compound.

The catalyst compounds described herein are used in combination with an activator (such as alumoxane) and an aluminum alkyl co-activator (such as triethylaluminum, tri-n-octyl aluminum, tri-isobutyl aluminum) with or without a trialkyl aluminum scavenger. The catalyst compound combined with the activator and aluminum alkyl co-activator is referred to as a catalyst system. Preferred alkyl aluminums include dialkyl aluminums and trialkyl aluminums, preferably those represented by the formulae: $R_2AlH$ and $R_3Al$, where each R is independently a $C_1$ to $C_{20}$ alkyl group, preferably $C_1$ to $C_{12}$ alkyl group, preferably a $C_1$ to $C_8$ alkyl group, preferably methyl, ethyl, propyl, butyl, pentyl, hexyl, octyl, nonyl, decyl, undecyl, dodecyl, and isomers thereof (such as isopropyl or isobutyl). Aluminum alkyl or organo-aluminum compounds, which may be utilized as co-activators herein, include triethyl aluminum, triethyl aluminum, triisobutyl aluminum, tri-n-hexyl aluminum, tri-n-octyl aluminum, and the like. A particularly preferred alkyl aluminum is trimethyl aluminum. However, if TMA is to be used as the scavenger, care should be taken to ascertain the effects, if any, on the catalyst systems having specific TMA concentrations disclosed herein.

In an alternate embodiment, the catalyst compounds disclosed herein are used with a second catalyst compound (such as those disclosed here), preferably in combination with a chain shuttling agent such as diethylzinc.

In one embodiment, alumoxane activators are utilized as an activator in the catalyst composition useful in the invention. An alumoxane is generally a mixture of both the linear and cyclic compounds. Alumoxanes are generally thought to be oligomeric compounds containing —Al($R^1$)—O— sub-units, where $R^1$ is an alkyl group. Examples of alumoxanes include methyl alumoxane (MAO), modified methyl alumoxane (MMAO), ethylalumoxane and isobutyl alumoxane. Alkylalumoxanes and modified alkyl alumoxanes are suitable as catalyst activators, particularly when the abstractable ligand is a halide, alkoxide or amide. Mixtures of different alumoxanes and modified alumoxanes may also be used.

Alumoxanes useful herein include those represented by the following formulae:

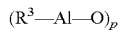

and

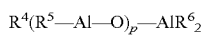

where $R^3$, $R^4$, $R^5$, and $R^6$ are, independently a $C_1$-$C_{30}$ alkyl radical, for example, methyl, ethyl, propyl, butyl, pentyl, hexyl, heptyl, octyl, nonyl, decyl; and "p" is an integer from 1 to about 50. Most preferably, $R^3$, $R^4$, $R^5$, and $R^6$ are each methyl; and "p" is a least 4. When an alkyl aluminum halide or alkoxide is employed in the preparation of the alumoxane, one or more $R^{3-6}$ groups may be halide or alkoxide.

It is recognized that alumoxane is not a discrete material. A typical alumoxane will contain free trisubstituted or trialkyl aluminum, bound trisubstituted or trialkyl aluminum, and alumoxane molecules of varying degree of oligomerization. The methyl alumoxanes most preferred tend to contain lower levels of trimethyl aluminum. Lower levels of trimethylaluminum can be achieved by reaction of the trimethylaluminum with a Lewis base or by vacuum distillation of the trimethylaluminum or by any other means known in the art.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio.

Alumoxanes may be produced by the hydrolysis of the respective trialkyl aluminum compound. MMAO may be produced by the hydrolysis of trimethylaluminum and a higher trialkyl aluminum such as triisobutyl aluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; European Publications EP-A-0 561 476, EP-B1-0 279 586, EP-A-0 594-218, and EP-B1-0 586 665; and PCT Publications WO 94/10180 and WO 99/15534; all of which are herein fully incorporated by reference. It may be preferable to use a visually clear methylalumoxane. A cloudy or gelled alumoxane can be filtered to produce a clear solution or clear alumoxane can be decanted from the cloudy solution. Another useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

The alumoxane/trialkyl aluminum activator combination may also be used with a non-coordinating anion. Particularly useful NCA's include N,N-dimethylanilinium tetrakisperfluorophenylborate, triphenylmethyl tetrakisperfluorophenylborate, N,N-dimethylanilinium tetrakisperfluoronapthylborate and the like, including the activators described in U.S. Pat. No. 5,198,401. Further useful activator/catalyst combinations include NCA's and metallocenes on support as described in U.S. Pat. Nos. 6,040,261; 5,427,991; 5,869,723; and 5,643,847; and EP 824,112.

In a preferred embodiment the catalyst, activator and coactivator are supported on an inorganic oxide, such as silica, fumed silica and the like. A preferred silica is one having an average particle size of 10 to 100 microns, preferably 20 to 50 microns, preferably 20 to 35 microns. A useful silica is available from Ineos Silicas, England under the tradename INEOS™ ES757. A preferred combination is MAO/(n-$C_3Cp)_2Hf$—$X_2$ (where $X_2$ is di-halide or di-alkyl, preferably methyl, ethyl, propyl, butyl, bromide, chloride or fluoride) on silica, preferably dimethyl on silica or difluoride on silica. The silica may be dried or calcined prior to placing the catalyst, activator and co-activator on the support. The catalyst, activator, and co-activator may be placed on the support in any order.

It is preferred that the support material, most preferably an inorganic oxide, such as silica, has a surface area in the range of from about 10 to about 700 $m^2/g$, pore volume in the range of from about 0.1 to about 4.0 cc/g, and average particle size in the range of from about 5 to about 500 μm. More preferably, the surface area of the support material is in the range of from about 50 to about 500 $m^2/g$, pore volume of from about 0.5 to about 3.5 cc/g, and average particle size of from about 10 to about 200 μm. Most preferably the surface area of the support material is in the range is from about 100 to about 400 $m^2/g$, pore volume from about 0.8 to about 3.0 cc/g, and average particle size is from about 5 to about 100 μm. The average pore size of the carrier useful in the invention typically has pore size in the range of from 10 to 1000 Å, preferably 50 to about 500 Å, and most preferably 75 to about 350 Å.

Further description of useful catalyst compounds are found in U.S. Pat. Nos. 6,242,545; 6,248,845; and 6,956,088; and in U.S. Application Publication Nos. 2005/0171283 A1 and 2005/0215716 A1; all of which are fully incorporated herein by reference.

The hafnium transition metal metallocene-type catalyst compounds and catalyst systems presently employed are suited for the polymerization of monomers, and, optionally, one or more comonomers, in any catalytic polymerization process, solution phase, gas phase, or slurry phase. Preferably, a gas or slurry phase process is used. In particular, the process used to polymerize polymers (particularly, LLDPE's) is as described in the specification and examples of U.S. Pat. Nos. 6,936,675 and 6,528,597, which are fully incorporated herein by reference.

In the processes used to manufacture the LLDPE's described herein, the monomer supplied to the polymerization zone is regulated to provide a ratio of ethylene to alpha-olefin comonomer so as to yield a polyethylene having a comonomer content, as a bulk measurement, of from about 0.5 to about 25.0 mol % comonomer. The reaction temperature, monomer residence time, catalyst system component quantities, and molecular weight control agent (such as $H_2$) may be regulated so as to provide a LLDPE resin having a Mw from about 10,000 to about 500,000 g/mol, and a MWD value of from about 1.0 to about 5. Specifically, comonomer to ethylene concentration or flow rate ratios are commonly used to control resin density. Similarly, hydrogen to ethylene concentrations or flow rate ratios are commonly used to control resin molecular weight. In both cases, higher levels of a modifier results in lower values of the respective resin parameter. Gas concentrations may be measured by, for example, an on-line gas chromatograph or similar apparatus to ensure relatively constant composition of recycle gas streams. One skilled in the art will be able to optimize these modifier ratios and the given reactor conditions to achieve a targeted resin melt index, density, and/or other resin properties. Additionally, the use of a process continuity aid, while not required, may be desirable in any of the foregoing processes. Such continuity aids are well known to persons of skill in the art and include, for example, metal stearates (particularly, calcium stearate).

One or more reactors in series or in parallel may be used in the present invention. Catalyst component, activator and co-activator may be delivered as a suspension or slurry, activated in-line just prior to the reactor or preactivated and pumped as an activated suspension or slurry to the reactor. A preferred operation is two catalyst compounds or systems activated in-line. For more information on methods to introduce multiple catalysts into reactors, please see U.S. Pat. No. 6,399,722, and WO 01/30862A1. While these references may emphasize gas phase reactors, the techniques described are equally applicable to other types of reactors, including continuous stirred tank reactors, slurry loop reactors and the like. Polymerizations herein are carried out in either single reactor operation, in which monomer, comonomers, catalyst/activator/co-activator, scavenger, and optional modifiers are added continuously to a single reactor or in series reactor operation, in which the above components are added to each of two or more reactors connected in series. The catalyst components can be added to the first reactor in the series and may also be added to both reactors, with one component being added to first reactor and another component to other reactors.

In one embodiment, 500 ppm or less of hydrogen is added to the polymerization, or 400 ppm or less, or 300 ppm or less.

In other embodiments, at least 50 ppm of hydrogen is added to the polymerization, or 100 ppm or more, or 150 ppm or more.

In another embodiment, the polymerization process is run with scavengers, such as trimethyl aluminum, tri-isobutyl aluminum, and an excess of alumoxane or modified alumoxane. However, if TMA is to be used as the scavenger, care should be taken to ascertain the effects, if any, on the catalyst systems having specific TMA concentrations disclosed herein. Alternately, the process, preferably a slurry or gas phase process, is operated in the absence of or essentially free of any scavengers, such as triethylaluminum, trimethylaluminum, tri-isobutylaluminum, tri-n-hexyl aluminum, diethyl aluminum chloride, dibutyl zinc, and the like. This process is described in PCT Publication WO 96/08520 and U.S. Pat. No. 5,712,352, which are herein fully incorporated by reference.

Gas Phase Polymerization

The polymers described herein may be made in gas phase. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C. In another embodiment, when higher density polyethylene is desired then the reactor temperature is typically between 70° C. and 105° C.

The productivity of the catalyst or catalyst system in a gas phase system is influenced by the partial pressure of the main monomer. The preferred mol % of the main monomer, ethylene, or propylene, preferably ethylene, is from about 25 to 90 mol % and the comonomer partial pressure is often in the range of from about 138 to about 2069 kPa, preferably about 517 to about 2069 kPa, which are typical conditions in a gas phase polymerization process. Also, in some systems the presence of comonomer can increase productivity.

In a preferred embodiment, the catalyst system (preferably supported) is introduced into a gas phase rector where the gas phase polymerization occurs at a temp of 70° C. to 105° C., a pressure of 690 to 2415 kPa, and is a continuous process preferably using a fluidized bed and a recycle stream as fluidizing medium.

In another preferred embodiment, the catalyst system (preferably supported) is introduced into a gas phase rector where the gas phase polymerization occurs at a temperature of 70° C. to less than 85° C. (preferably from 75° C. to 80° C.), an ethylene partial pressure of 105 psi (0.72 MPa) or more (preferably 109 psi (0.75 MPa) or more, preferably 222 psi (1.53 MPa) or more, preferably 240 psi (1.66 MPa) or more, preferably 260 psi (1.79 MPa) or more), and is a continuous process preferably using a fluidized bed and a recycle stream as fluidizing medium. In a particularly preferred process, the ethylene partial pressure is greater than 30 mol %, alternately greater than 50 mol %, alternately greater than 80 mol %, alternately greater than 82.5 mol %. In another preferred embodiment, the ethylene partial pressure is 50 psi (345 kPa) to 500 psi (3448 kPa), preferably 50 psi (345 kPa) to 250 psi (1724 kPa), preferably 100 psi (690 kPa) to 240 psi (1655 kPa). In another particularly preferred process, isopentane is used as a condensing agent.

Slurry Phase Polymerization

The polymers described herein may be made in slurry phase. A slurry polymerization process generally operates between 1 to about 50 atmosphere pressure range (15 psi to 735 psi (103 kPa to 5068 kPa)) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique useful in the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is fully incorporated herein by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment, 500 ppm or less of hydrogen is added, or 400 ppm or less, or 300 ppm or less. In other embodiments, at least 50 ppm of hydrogen is added, or 100 ppm or more, or 150 ppm or more.)

The reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer, and a nitrogen purge column in sequence for removal of the isobutane diluent and all unreacted monomer and comonomers. The resulting hydrocarbon free powder is then compounded for use in various applications.

In another embodiment, in the slurry process useful in the invention, the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment, in the slurry process useful in the invention, the concentration of predominant monomer in the reactor liquid medium is in the range of from about 1 to 10 wt %, preferably from about 2 to about 7 wt %, more preferably from about 2.5 to about 6 wt %, most preferably from about 3 to about 6 wt %.

In any of the polymerization process described above, the catalyst productivity (grams of catalyst per gram of polymer (g/g)) is typically greater than 4000, more preferably greater than 5000, even more 5 preferably greater than 5500 and most preferably greater than 6000. In one embodiment where the polymer product is an ethylene/hexene copolymer the catalyst has a productivity greater than 1500, preferably greater than 2000, more preferably greater than 2500 and most preferably greater than 3000.

Blends

In another embodiment, the polymer (preferably the polyethylene) produced herein is combined with one or more additional polymers prior to being formed into a film, molded part or other article. Other useful polymers include isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

Preferred ethylene-based polymer compositions also include blends of the ethylene polymer (preferably a linear low density polyethylene) and one or more additional polymers selected from the following: one or more very low density polyethylenes, one or more low density polyethylenes, one or more medium density polyethylenes, one or more high density polyethylenes, one or more differentiated polyethylene, or other conventional polymers.

In alternate embodiments, elastomers are blended with the polymer (preferably the LLDPE) produced herein to form rubber toughened compositions that are typically formed into films or molded parts. In a particularly preferred embodiment, the rubber toughened composition is a two (or more) phase system where the elastomer is a discontinuous phase and the polymer produced by this invention is a continuous phase. This blend may be combined with tackifiers and/or other additives as described herein.

In a preferred embodiment, the polymer (preferably the polyethylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

End-Use Applications

Specifically, any of the foregoing polymers, such as the foregoing polyethylenes or blends thereof, may be used in a variety of end-use applications. Such applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

In another embodiment, the layer comprising the polyethylene composition of this invention (and/or blends thereof)

may be combined with one or more other layers. The other layer(s) may be any layer typically included in multilayer film structures. For example, the other layer or layers may be: 1) Polyolefins: Preferred polyolefins include homopolymers or copolymers of $C_2$ to $C_{40}$ olefins, preferably $C_2$ to $C_{20}$ olefins, preferably a copolymer of an alpha-olefin and another olefin or alpha-olefin (ethylene is defined to be an alpha-olefin for purposes of this invention). Preferably, homopolyethylene, homopolypropylene, propylene copolymerized with ethylene, and/or butene, ethylene copolymerized with one or more of propylene, butene, or hexene, and optional dienes. Preferred examples include thermoplastic polymers, such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene, and/or butene, and/or hexene, elastomers, such as ethylene propylene rubber, ethylene propylene diene monomer rubber, neoprene, and blends of thermoplastic polymers and elastomers, such as, for example, thermoplastic elastomers and rubber toughened plastics. 2) Polar polymers: Preferred polar polymers include homopolymers and copolymers of esters, amides, acetates, anhydrides, copolymers of a $C_2$ to $C_{20}$ olefin, such as ethylene, and/or propylene, and/or butene with one or more polar monomers, such as acetates, anhydrides, esters, alcohol, and/or acrylics. Preferred examples include polyesters, polyamides, ethylene vinyl acetate copolymers, and polyvinyl chloride. 3) Cationic polymers: Preferred cationic polymers include polymers or copolymers of geminally disubstituted olefins, alpha-heteroatom olefins, and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene. 4) Miscellaneous: Other useful layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly, polypropylene spun bonded fibers or non-wovens), and substrates coated with inks, dyes, pigments, PVDC, and the like.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

The films described herein may also comprise from 5 to 60 wt %, based upon the weight of the polymer and the resin, of a hydrocarbon resin. The resin may be combined with the polymer of the outer (such as seal) layer(s) or may be combined with the polymer in the core layer(s).

The films described above may be used as stretch and/or cling films with or without common tackifying additives (such as polybutenes, terpene resins, alkali metal stearates, and hydrogenated rosins and rosin esters), and/or modification by well-known physical processes (such as corona discharge). Stretch/clings films may comprise a slip layer comprising any suitable polyolefin or combination of polyolefins such as polyethylene, polypropylene, copolymers of ethylene and propylene, and polymers obtained from ethylene, and/or propylene copolymerized with minor amounts of other olefins, particularly, $C_4$ to $C_{12}$ olefins. Particularly preferred are polypropylene and linear low density polyethylene (LLDPE).

Multiple-layer films may be formed by methods well known in the art. The total thickness of multilayer films may vary based upon the application desired. A total film thickness of about 5 to 100 μm, more typically about 10 to 50 μm, is suitable for most applications. Those skilled in the art will appreciate that the thickness of individual layers for multilayer films may be adjusted based on desired end-use performance, resin, or copolymer employed, equipment capability, and other factors. The materials forming each layer may be coextruded through a coextrusion feedblock and die assembly to yield a film with two or more layers adhered together but differing in composition.

When used in multilayer films, the LLDPE polymer blends are typically used in at least three layers and may be used in any layer of the film, as desired. When more than one layer of the film is formed of a LLDPE polymer blend, each such layer can be individually formulated; i.e., the layers formed of the LLDPE polymer blend can be the same or different chemical composition, density, melt index, thickness, etc., depending upon the desired properties of the film.

To facilitate discussion of different film structures, the following notation is used herein. Each layer of a film is denoted "A" or "B", where "A" indicates a conventional film layer as defined below, and "B" indicates a film layer formed of any of the LLDPE polymers or blends. Where a film includes more than one A layer or more than one B layer, one or more prime symbols (', ", '", etc.) are appended to the A or B symbol to indicate layers of the same type (conventional or inventive) that can be the same or can differ in one or more properties, such as chemical composition, density, melt index, thickness, etc. Finally, the symbols for adjacent layers are separated by a slash (/). Using this notation, a three-layer film having an inner layer of a LLDPE polymer blend disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 μm each and a B layer of 30 μm is denoted as 20/60/20.

For the various films described herein, the "A" layer can be formed of any material known in the art for use in multilayer films or in film-coated products. Thus, for example, each A layer can be formed of a polyethylene homopolymer or copolymer, and the polyethylene can be, for example, a VLDPE, a LDPE, a LLDPE, a MDPE, a HDPE, or a DPE, as well as other polyethylenes known in the art. The polyethylene can be produced by any suitable process, including metallocene-catalyzed processes and Ziegler-Natta catalyzed processes. Further, each A layer can be a blend of two or more such polyethylenes, and can include additives known in the art. Further, one skilled in the art will understand that the layers of a multilayer film must have the appropriate viscosity match.

In multilayer structures, one or more A layers can also be an adhesion-promoting tie layer, such as PRIMACOR™ ethylene-acrylic acid copolymers available from The Dow Chemical Company, and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and paper.

The "B" layer is formed of a LLDPE polymer or blend, and can be any of such blends described herein. In one embodiment, the B layer is formed of a blend of (a) from 0.1 to 99.9 wt % of a first polymer selected from the group consisting of very low density polyethylene, medium density polyethylene, differentiated polyethylene, and combinations thereof; and (b) from 99.9 to 0.1 wt % of a second polymer comprising a LLDPE polymer or copolymer produced by gas-phase polymerization of ethylene and, optionally, an alpha-olefin with a catalyst having as a transition metal component a bis(n-$C_{3-4}$ alkyl cyclopentadienyl)hafnium compound, wherein the transition metal component comprises from about 95 to about 99 mol % of the hafnium compound. The copolymer of (b) is preferably characterized by a comonomer content of up to about 5 mol %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. In preferred embodiments, the polymer of (a) is different from the polymer of (b).

The thickness of each layer of the film, and of the overall film, is not particularly limited, but is determined according to the desired properties of the film. Typical film layers have a thickness of from about 1 to about 1000 μm, more typically from about 5 to about 100 μm, and typical films have an overall thickness of from about 10 to about 100 μm.

In further applications, microlayer technology may be used to produce films with a large number of thinner layers. For example, microlayer technology may be used to obtain films having, for example, 24, 50, or 100 layers, in which the thickness of an individual layer is less than 1 μm. Individual layer thicknesses for these films may be less than 0.5 μm, less than 0.25 μm, or even less than 0.1 μm.

In other embodiments, using the nomenclature described above, multilayer films have any of the following exemplary structures: (a) two-layer films, such as A/B and B/B; (b) three-layer films, such as A/B/A', A/A'/B, B/A/B', and B/W/B"; (c) four-layer films, such as A/A'/A"/B, A/A'/B/A", A/A'/B/B', A/B/A'/B', A/B/W/A', B/A/A'/B', A/B/B'/B", B/A/B'/B", and B/B'/B"/B"'; (d) five-layer films, such as A/A'/A"/A"'/B, A/A'/A"/B/A"', A/A'/B/A'/A"", A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/A', B/A/A'/B'/B", B/A/B'/A'/B", A/B/B'/B"/A', A/B/B'/B"/B"', B/A/B'/B"/B"', B/B'/A/B"/B"', and B/B'/B"/B"'/B""; and similar structures for films having six, seven, eight, nine, twenty-four, forty-eight, sixty-four, one hundred, or any other number of layers. It should be appreciated that films having still more layers can be formed using the LLDPE polymers or blends, and such films are within the scope of the invention.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films composed of LLDPE polymer blends can also be used as coatings; e.g., films formed of the inventive polymers or polymer blends, or multilayer films including one or more layers formed of the inventive polymers or polymer blends, can be coated onto a substrate such as paper, metal, glass, plastic, and other materials capable of accepting a coating. Such coated structures are also within the scope of the present invention.

In another aspect, provided are any polymer products containing the LLDPE polymer or polymer blend compositions produced by methods known in the art. In addition, also included are products having other specific end-uses, such as film-based products, which include stretch films, shrink films, bags (i.e., shipping sacks, trash bags and liners, industrial liners, and produce bags), flexible and food packaging (e.g., fresh cut produce packaging, frozen food packaging), personal care films, pouches, medical film products, diaper back sheets, and house wrap. Products may also include packaging, for example, by bundling, packaging and unitizing a variety of products. Applications for such packaging include various foodstuffs, rolls of carpet, liquid containers, and various like goods normally containerized and/or palletized for shipping, storage, and/or display.

In some embodiments, stretch cling films may be formed from the LLDPE polymers and polymer blends described herein. The stretch cling films may be monolayer or multilayer, with one or more layers comprising the LLDPE polymers or blends. In some embodiments, the films may be coextruded, comprising one or more layers made from the LLDPE polymers or blends described herein, along with one or more layers of traditional Ziegler-Natta or metallocene-catalyzed LLDPE, which may, optionally, include a comonomer, such as, for example, hexene or octene.

Some resins and blends described herein may also be suited for use in stretch hand wrap films. Stretch film hand wrap requires a combination of excellent film toughness, especially puncture and dart drop performance, and a very stiff, i.e., difficult to stretch, film. This film 'stiffness' is required to optimize the stretch required to provide adequate load holding force to a wrapped load and to prevent further stretching of the film. The film toughness is required because hand wrap loads (being wrapped) are typically more irregular and frequently contain greater puncture requirements than typical machine stretch loads. In some embodiments, the films may be down gauged stretch hand wrap films. In further embodiments, LLDPE resins and blends may be blended with LDPE, other LLDPEs, or other polymers to obtain a material with characteristics suitable for use in stretch hand wrap films.

Further product applications may also include surface protection applications, with or without stretching, such as in the temporary protection of surfaces during manufacturing, transportation, etc. There are many potential applications of articles and films produced from the polymer blend compositions described herein.

The LLDPE resins and blends prepared as described herein are also suited for the manufacture of blown film in a high-stalk extrusion process. In this process, a polyethylene melt is fed through a gap (typically 1 to 1.6 mm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 12.7 to 50 microns and by a development of biaxial orientation in the melt. The expanded molten tube is rapidly cooled (which induces crystallization of the polymer), collapsed between a pair of nip rolls and wound onto a film roll.

Two factors are useful to determine the suitability of a particular polyethylene resin or blend for high stalk extrusion: the maximum attainable rate of film manufacture and mechanical properties of the formed film. Adequate processing stability is desired at, for example, throughput rates of up to 2.7 Kg/hr/cm die and high line speeds (>61 m/min) for thin gauge manufacture on modern extrusion equipment. Persons of skill in the art will recognize that varying throughput rates and line speeds may be used without departing from the spirit of the present invention, and that the figures given herein are intended for illustrative purposes only. The resins and blends produced as described herein have molecular characteristics which allow them to be processed successfully at these high speeds. Mechanical strength of the film is different in two film directions, along the film roll (machine direction, MD) and in the perpendicular direction (transverse direction, TD). Typically, the TD strength in such films is significantly higher than their MD strength. The films manufactured from the resins prepared in the process of this invention with the catalysts described herein have a favorable balance of the MD and TD strengths.

Films composed of LLDPE polymers or blends thereof show improved performance and mechanical properties when compared to films previously known in the art. For example, films containing the LLDPE polymers and blends described herein have improved seal strength and hot tack performance, increased toughness, and lower reblock. The films also have a good balance of stiffness vs. toughness as indicated by tear strength, 1% Secant Modulus, and Dart Impact performance. In addition, such films may also exhibit higher ultimate stretch and have better processability when compared with other LLDPE resins and blends.

In another embodiment this invention relates to:
1. A process for polymerizing olefins in which the amount of trimethylaluminum in a methylalumoxane solution is adjusted to be from 1 to 25 mol % (preferably 6 to 25 mol %, preferably 8 to 20 mol %, preferably 9 to 18 mol %, or alternately 1 to 18 wt %, preferably 4 to 18 wt %, preferably 6 to 14 wt %, preferably 7 to 13 wt %) or alternately from 1 to 25 wt % (preferably 6 to 25 wt %, preferably 8 to 20 wt %, preferably 9 to 18 wt %), prior to use as an activator, where the mol % (or wt %) trimethylaluminum is determined by $^1$H NMR of the solution prior to combination with any support.
2. A process for polymerizing olefins in which the amount of an unknown species present in a methylalumoxane solution is adjusted to be from 0.10 to 0.65 integration units, prior to use as an activator, where the unknown species is identified in the $^1$H NMR spectra of the solution prior to combination with any support and the integration units of the unknown species are defined on the basis of the TMA peak being normalized to 3.0 integration units.
3. The process of paragraph 1 or 2, wherein the methylalumoxane solution is present in a catalyst system also comprising a metallocene transition metal compound.
4. The process of paragraph 1 or 3, wherein the amount of trimethylaluminum is adjusted by adding or removing trimethylaluminum, preferably by adding or removing TMA to or from the methylalumoxane solution.
5. The process of paragraph 2 or 3, wherein the amount of an unknown species is adjusted by adding or removing trimethylaluminum.
5.5 The process of any of paragraphs 1 to 5 wherein methylalumoxane is present at at least 2 mol % in the methylalumoxane solution.
6. The process of any of paragraphs 2 to 5.5, wherein the catalyst system in methylalumoxane solution prior to combination with any support has an aluminum to transition metal molar ratio (preferably an aluminum to hafnium molar ratio) of 175:1 or less, preferably 175:1 to 50:1.
7. The process of any of paragraphs 2 to 6, wherein the metallocene transition metal compound is represented by the formula:

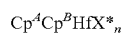

wherein each X* and each Cp group is chemically bonded to Hf, n is 1 or 2, $Cp^A$ and $Cp^B$ may be the same or different cyclopentadienyl ligands or ligands isolobal to cyclopentadienyl, either or both of which may contain heteroatoms and either or both of which may be substituted.
8. The process of paragraph 7, wherein $Cp^A$ and $Cp^B$ are independently selected from the group consisting of cyclopentadienyl, indenyl, tetrahydroindenyl, fluorenyl, and substituted derivatives of each.
9. The process of any of paragraphs 2 to 8, wherein the metallocene transition metal compound comprises a bis(n-$C_{3-4}$ alkyl cyclopentadienyl)hafnium dialkyl or dihalide.
10. The process of any of paragraphs 2 to 8, wherein the metallocene transition metal compound comprises bis(n-propyl cyclopentadienyl)hafnium dichloride and/or bis(n-propyl cyclopentadienyl)hafnium dimethyl.
11. The process to polymerize olefins of any of paragraphs 1 to 10, wherein the alumoxane solution is combined with a metallocene transition metal compound and with one or more olefins.
12. The process of any of paragraphs 1 to 11, wherein the polymerization process is a gas phase process.
13. The process of paragraph 11 or 12, wherein the olefins comprise ethylene and the ethylene partial pressure in the gas phase polymerization is from 50 to 250 psi (345 to 1724 kPa).
14. The process of any of paragraphs 1 to 11, wherein the polymerization process is a slurry phase process.
15. The process of any of paragraphs 1 to 14, wherein the olefins comprise ethylene and at least one $C_3$ to $C_{20}$ olefin.
16. The process of paragraph 15, wherein the $C_3$ to $C_{20}$ olefin is one or more of propylene, butene, hexene, and octene.
17. The process of paragraph 15, wherein the $C_3$ to $C_{20}$ olefin is hexene.
18. A copolymer produced by any of paragraphs 1 to 17, wherein the polymer produced is a copolymer comprising ethylene and from 0.5 to 25 mol % of $C_3$ to $C_{20}$ olefin comonomer, said copolymer having: a tensile stress at the secondary yield point of 12 MPa or more; a ratio of ultimate tensile strain to ultimate tensile stress of 20 or more; a tensile stress at 200% (MPa) that is greater than the tensile stress at the secondary yield point (MPa); a comonomer triad ([HHH] triad) of 0.0005 mol % or more, preferably 0.0006 or more; a density of 0.910 g/cm$^3$ or more, and a 1% secant modulus of 30 to 100 MPa.
19. A copolymer produced by any of paragraphs 1 to 17, wherein the polymer produced is a copolymer comprising ethylene and from 0.5 to 25 mol % of $C_3$ to $C_{20}$ olefin comonomer, said copolymer having: 1) a ratio of Ultimate Tensile Stress to Tensile Stress at 100% elongation of 2.5 or more; 2) a ratio of Ultimate Tensile Stress to Tensile Stress at 300% elongation of 2.4 or more; 3) a ratio of Ultimate Tensile Stress to Tensile Stress at the primary yield point of 2.9 or more; 4) a density of 0.910 g/cm$^3$ or more; 5) a 1% secant modulus of 30 to 100 MPa; and 6) a Tensile Stress of Y MPa or more, where Y=(0.0532)*Z−8.6733 and Z is the percent strain and is a number from 500 to 2000.

20. A copolymer comprising ethylene and from 0.5 to 25 mol % of $C_3$ to $C_{20}$ olefin comonomer, said copolymer having: a tensile stress at the secondary yield point of 15 MPa or more; a ratio of ultimate tensile strain to ultimate tensile stress of 19.9 or more; a tensile stress at 200% (MPa) that is greater than the tensile stress at the secondary yield point (MPa); a comonomer triad ([HHH] triad) of 0.0005 mol % or more, preferably 0.0006 mol % or more; a density of 0.910 g/cm$^3$ or more; and a 1% secant modulus of 30 to 100 MPa.

21. A copolymer comprising ethylene and from 0.5 to 25 mol % of $C_3$ to $C_{20}$ olefin comonomer, said copolymer having: 1) a ratio of Ultimate Tensile Stress to Tensile Stress at 100% elongation of 2.5 or more; 2) a ratio of Ultimate Tensile Stress to Tensile Stress at 300% elongation of 2.4 or more; 3) a ratio of Ultimate Tensile Stress to Tensile Stress at the primary yield point of 2.9 or more; 4) a density of 0.910 g/cm$^3$ or more; 5) a 1% secant modulus of 30 to 100 MPa; and 6) a Tensile Stress of Y MPa or more, where Y=(0.0532)*Z−8.6733 and Z is the percent strain and is a number from 500 to 2000.

22. The copolymer of any of paragraphs 18 to 21, wherein the copolymer comprises ethylene and from 0.5 to 25 mol % of hexene.

23. The copolymer of paragraphs 18 to 21, wherein the copolymer has an Mw of from 5000 to 1,000,000 g/mol.

24. A film formed from the copolymers of any of paragraphs 18 to 23.

25. A process to produce block copolymers comprising adjusting the amount of trimethyl aluminum in a methylalumoxane solution prior to use as an activator to obtain [HHH] fractions that differ by at least 5% relative to each other.

26. The process of paragraph 25, wherein the process is a continuous process and the TMA is adjusted on-line prior to entry into a polymerization reactor.

27. The process of paragraph 26, wherein the TMA is added intermittently to the methylalumoxane solution before or after combination with a catalyst compound.

28. The process of any of paragraphs 1 to 18 or 25 to 27, wherein the TMA is adjusted by adding a Bronsted Acid to the methylalumoxane solution before or after combination with a catalyst compound.

29. The polymer produced by the process of any of paragraphs 1 to 18, 25, 26, 27 or 28, or the polymer (or film thereof) of any of paragraphs 19 to 24, wherein the deviation from random when the random [HHH] mol fraction of the copolymer is subtracted from the measured random [HHH] mol fraction is greater than zero, and/or the deviation from random when the random [EHE] mol fraction of the copolymer is subtracted from the measured random [EHE] mol fraction is greater than zero.

30. The polymer produced by the process of any of paragraphs 1 to 18, 25 to 29, or the polymer (or film thereof) of any of paragraphs 19 to 24, wherein the polymer has a tensile strength at yield of greater than 11 MPa, and/or an ultimate elongation of greater than 750%, and/or an Ultimate stress of less than 40 MPa, and/or an Ultimate strain to Ultimate stress ratio of greater than 17, and/or a 1% secant modulus of 30 to 100 MPa, and/or an intrinsic tear of 300 g/mil or less.

31. An ethylene-$C_4$ to $C_8$ alpha olefin copolymer (preferably butene, hexene or octene) having from 0.5 to 25 mol % comonomer and a density of 0.910 g/cm$^3$ or more where the deviation from random when the calculated random [HHH] mol fraction of the copolymer is subtracted from the measured [HHH] mol fraction is greater than zero, and/or the calculated random [EHE] mol fraction of the copolymer is subtracted from the measured [EHE] mol fraction is greater than zero.

This invention also relates to:

1A. A process for polymerizing olefins comprising contacting one or more olefins with a catalyst system comprising a metallocene transition metal compound and a methylalumoxane solution, in which process the amount of trimethylaluminum in the methylalumoxane solution is adjusted to be from 1 to 25 mol % or 1 to 25 wt %, prior to use as an activator, where the mol % or wt % trimethylaluminum is determined by $^1$H NMR of the solution prior to combination with any support.

2A. A process for polymerizing olefins comprising contacting one or more olefins with a catalyst system comprising a metallocene transition metal compound and a methylalumoxane solution, in which process the amount of an unknown species present in the methylalumoxane solution is adjusted to be from 0.10 to 0.65 integration units on the basis of the trimethylaluminum peak being normalized to 3.0 integration units, prior to use as an activator, where the unknown species is identified as the third signal in a $^1$H NMR spectrum of the solution prior to combination with any support in addition to the signal relating to oligomeric methylalumoxane and the signal relating to trimethylaluminum, wherein said three signals mentioned herein do not comprise any solvent signals.

3A. The process of paragraph 1A or 2A, wherein the amount of trimethylaluminum and the amount of the unknown species are adjusted by adding or removing trimethylaluminum, preferably by adding or removing trimethylaluminum to or from the methylalumoxane solution.

4A. The process of any of paragraphs 1A to 3A, wherein the catalyst system in methylalumoxane solution prior to combination with any support has an aluminum to transition metal molar ratio (preferably an aluminum to hafnium molar ratio) of 175:1 or less.

5A. The process of any of paragraphs 1A to 4A, wherein the metallocene transition metal compound is represented by the formula:

$$Cp^A Cp^B HfX^*_n$$

wherein each X* and each Cp group is chemically bonded to Hf, n is 1 or 2, $Cp^A$ and $Cp^B$ may be the same or different cyclopentadienyl ligands or ligands isolobal to cyclopentadienyl, either or both of which may contain heteroatoms and either or both of which may be substituted, and wherein the process is preferably a gas phase process.

6A. A method for influencing the inter- and/or intramolecular comonomer distribution and/or the molecular weight distribution in a copolymer by means of adjusting the amount of trimethylaluminum in the catalyst system used in the polymerization process, the catalyst system comprising methylalumoxane solution and a metallocene transition metal compound.

7A. The method according to paragraph 6A, wherein in a copolymer the comonomer triad ([HHH]) content is increased and/or the [HEH] triad content is increased and/or the molecular weight distribution is decreased by means of decreasing the amount of trimethylaluminum in the catalyst system comprising methylalumoxane solution and a metallocene transition metal compound, wherein E refers to an ethylene-derived unit and H refers to a comonomer-derived unit in the copolymer.

8A. A method for improving film performance, preferably tear and/or impact resistance, of a film made of an ethylene copolymer, by means of decreasing the amount of trimethylaluminum in the catalyst system used in the polymerization process, the catalyst system comprising methylalumoxane solution and a metallocene transition metal compound.

9A. The method of any of paragraphs 6A to 8A, wherein the polymerization process is a continuous process, preferably a gas-phase process, and the amount of trimethylaluminum is adjusted on-line prior to entry into a polymerization reactor.

10A. A method for monitoring the amount of trimethylaluminum in a catalyst system used in a polymerization process, the catalyst system comprising methylalumoxane solution and a metallocene transition metal compound, by monitoring the intensity (by means of integration units) of a $^1$H NMR signal relating to an unknown species present in the methylalumoxane solution, which signal is the third signal in the $^1$H NMR spectrum of the solution prior to combination with any support in addition to the signal relating to oligomeric methylalumoxane and the signal relating to trimethylaluminum, wherein said three signals mentioned herein do not comprise any solvent signals.

11A. A copolymer produced by the process of any of paragraphs 1A to 5A or the method of any of claims 6A to 9A.

12A. The copolymer of paragraph 11A, which is a copolymer comprising ethylene and from 0.5 to 25 mol % of $C_3$ to $C_{20}$ olefin comonomer, said copolymer having: a tensile stress at the secondary yield point of 12 MPa or more; a ratio of ultimate tensile strain to ultimate tensile stress of 20 or more; a tensile stress at 200% (MPa) that is greater than the tensile stress at the secondary yield point (MPa); a comonomer triad ([HHH] triad) of 0.0005 mol % or more; a density of 0.910 g/cm$^3$ or more, and a 1% secant modulus of 30 to 100 MPa.

13A. The copolymer of any of claims 11A or 12A, wherein the deviation from random when the random [HHH] mol fraction of the copolymer is subtracted from the measured random [HHH] mol fraction is greater than zero, and/or the deviation from random when the random [EHE] mol fraction of the copolymer is subtracted from the measured random [EHE] mol fraction is greater than zero.

14A. The copolymer of any of paragraphs 11A to 13A, wherein the polymer has a tensile strength at yield of greater than 11 MPa, and/or an ultimate elongation of greater than 750%, and/or an Ultimate stress of less than 40 MPa, and/or an Ultimate strain to Ultimate tensile stress ratio of greater than 17, and/or a 1% secant modulus of 30 to 100 MPa, and/or an intrinsic tear of 300 g/mil or less.

15A. An ethylene-$C_4$ to $C_8$ alpha olefin copolymer having from 0.5 to 25 mol % comonomer and a density of 0.910 g/cm$^3$ or more where the deviation from random when the calculated random [HHH] mol fraction of the copolymer is subtracted from the measured [HHH] mol fraction is greater than zero, and/or the calculated random [EHE] mol fraction of the copolymer is subtracted from the measured [EHE] mol fraction is greater than zero, wherein E refers to ethylene and H refers to a $C_4$ to $C_8$ alpha olefin comonomer-derived unit in the copolymer.

EXAMPLES

Tests and Materials

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction. Elmendorf tear (tear) was measured as specified by ASTM D-1922. Tensile properties, including Young's modulus, tensile strength, tensile stress, ultimate tensile stress, tensile strain, ultimate tensile strain, tensile stress at 100% (200%, 300%, 400%, 500%, 600%, 700%, 800%, etc.) elongation, stress and strain at the primary yield point, stress and strain at the secondary yield point, 1% and 2% Secant modulus, tensile strength at yield, tensile strength at break, ultimate tensile strength, elongation at yield, elongation at break, yield stress, and strain hardening were measured as specified by ASTM D-882. Melt index (MI) and high load melt index (HLMI) were determined according to ASTM 1238 (190° C., 2.16 (1-2) or 21.6 kg (1-21), respectively). Melt index ratio (MIR) was determined according to ASTM 1238 and is the ratio of HLMI to MI (e.g., 1-21/1-2). In the event a weight is not specified as part of a melt index, it is assumed that 2.16 kg was used. Density was determined measured as specified by ASTM D-1505 using chips cut from plaques compression molded in accordance with ASTM D-4703-07, aged in for 40 hrs at 23° C. plus or minus 2° C., unless specifically stated otherwise. Dart Drop (also known as Dart $F_{50}$, or Dart Drop Impact or Dart Drop Impact Strength) was measured as specified by ASTM D-1709, method A. Tm, Hf, Tc, and Hc were measured using the DSC procedure as follows: Samples weighing approximately 5 to 10 mg were sealed in aluminum sample pans. The DSC data were recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. The melting temperature (Tm) and heat of fusion (Hf) were measured and reported during the second heating cycle (or second melt). The crystallization temperature (Tc) and heat of crystallization (Hc) were measured and reported during the first heating cycle (or first melt). Prior to the DSC measurement, the sample is aged (typically by holding it at ambient temperature for a period of 5 days) or annealed to maximize the level of crystallinity.

CFC (Cross Fractionation Analysis) of the polymers below was performed by PolymerChar, Valencia Spain. PolymerChar's procedure used a commercial TREF instrument (Model MC2, Polymer Char S.A.) to fractionate the resin into Chemical Composition Fractions and analyze the fraction using GPC methodology. This procedure employs a sequential TREF separation followed by a GPC analysis. Approximately 150 mg of sample is dissolved in 20 ml of o-DCB, then an aliquot of the solution (0.5 ml) is loaded in the instrument's column, crystallized and fractions by increasing the temperature stepwise and using a fixed pump flow rate. Approximately 0.5 ml portions of the fractions coming out of the TREF fractionation at each temperature step are passed through a GPC column(s) heated at 150° C. using a volumetric flow rate of 1 ml/min and then through the infrared detector. GPC chromatograms of each fraction obtained from the TREF fractionation at each temperature step are recorded. Approximately 43 GPC chromatograms are obtained per sample. These data were then grouped by peak elution temperature. The data are reported in Table 5.

The elements present in a sample are determined using ICPES (Inductively Coupled Plasma Emission Spectrometry), which is described in J. W. Olesik, "Inductively Coupled Plasma-Optical Emission Spectroscopy," in Encyclopedia of Materials Characterization, C. R. Brundle, C. A.

Evans, Jr. and S. Wilson, eds., Butterworth-Heinemann, Boston, Mass., 1992, pp. 633-644).

Molecular weight distribution (polydispersity) is Mw/Mn. Measurements of weight average molecular weight ($M_w$), number average molecular weight (MO, and z average molecular weight (Mz) are determined by Gel Permeation Chromatography as described in Macromolecules, 2001, Vol. 34, No. 19, pg. 6812, which is fully incorporated herein by reference, including that, a High Temperature Size Exclusion Chromatograph (SEC, Waters Alliance 2000), equipped with a differential refractive index detector (DRI) equipped with three Polymer Laboratories PLgel 10 mm Mixed-B columns is used. The instrument is operated with a flow rate of 1.0 cm$^3$/min, and an injection volume of 300 µL. The various transfer lines, columns and differential refractometer (the DRI detector) are housed in an oven maintained at 145° C. Polymer solutions are prepared by heating 0.75 to 1.5 mg/mL of polymer in filtered 1,2,4-Trichlorobenzene (TCB) containing ~1000 ppm of BHT at 160° C. for 2 hours with continuous agitation. A sample of the polymer containing solution is injected into the GPC and eluted using filtered 1,2,4-Trichlorobenzene (TCB) containing ~1000 ppm of BHT. The separation efficiency of the column set is calibrated using a series of narrow MWD polystyrene standards reflecting the expected Mw range of the sample being analyzed and the exclusion limits of the column set. Seventeen individual polystyrene standards, obtained from Polymer Laboratories (Amherst, Mass.) and ranging from Peak Molecular Weight (Mp) ~580 to 10,000,000, were used to generate the calibration curve. The flow rate is calibrated for each run to give a common peak position for a flow rate marker (taken to be the positive inject peak) before determining the retention volume for each polystyrene standard. The flow marker peak position is used to correct the flow rate when analyzing samples. A calibration curve (log(Mp) vs. retention volume) is generated by recording the retention volume at the peak in the DRI signal for each PS standard, and fitting this data set to a 2nd-order polynomial. The equivalent polyethylene molecular weights are determined by using the Mark-Houwink coefficients shown in Table B.

TABLE B

| Mark-Houwink coefficients | | |
|---|---|---|
| Material | k (dL/g) | A |
| PS | 1.75 × 10−4 | 0.67 |
| PE | 5.79 × 10−4 | 0.695 |

The $^{13}$C NMR spectroscopic analysis is conducted as follows: Polymer samples for $^{13}$C NMR spectroscopy are dissolved in $d_2$-1,1,2,2-tetrachloroethane at concentrations between 10 to 15 wt % prior to being inserted into the spectrometer magnet. $^{13}$C NMR data is collected at 120° C. in a 10 mm probe using a Varian spectrometer with a $^1$Hydrogen frequency of 700 MHz. A 90° pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired using time averaging to provide a signal to noise level adequate to measure the signals of interest. $^{13}$C NMR Chemical Shift Assignments and calculations involved in characterizing polymers are made as outlined in the work of M. R. Seger and G. Maciel, "Quantitative $^{13}$C NMR Analysis of Sequence Distributions in Poly(ethylene-co-1-Hexene)", Anal. Chem., 2004, 76, pp. 5734-5747. Triad concentrations are determined by spectral integration and normalized to give the mol fraction of each triad: ethylene-ethylene-ethylene (EEE), ethylene-ethylene-Hexene (EEH), ethylene-Hexene-ethylene (EHE), Hexene-ethylene-ethylene (HEE), Hexene-ethylene-Hexene (HEH), Hexene-Hexene-Hexene (HHH). The observed triad concentrations are converted into the following diad concentrations: ethylene-ethylene (EE), Hexene-Hexene (HH) and ethylene-Hexene (EH). The diad concentrations are determined by the following equations, where A represents one monomer and B the other.

$$[AA]=[AAA]+[AAB]/2$$

$$[AB]=2*[ABA]+[BBA]$$

The diad concentrations are then used to establish $r_1 r_2$ as follows:

$$r_1 r_2 = 4 * \frac{EE * HH}{(EH)^2}.$$

Mol percent 1-Hexene (Mol % comonomer) is determined as follows:

Mol Percent Hexene=(HHH+HHE+EHE)*100.

Run Number is determined as follows:

$$\text{Run Number} = \left(HEH + \frac{1}{2} * HEE\right) * 100.$$

Average ethylene run length is calculated by dividing the comonomer content (mol %) by the run number.

Average Ethylene Run Length=(HEH+EEH+EEE)/(run number).

"Butyls" per 1000 carbons is calculated by dividing the 1-Hexene-centered triads by the sum of twice the ethylene-centered triads plus six times the 1-Hexene-centered triads and the resultant quotient multiplying by 1000.

Butyls per 1000 Carbons =

$$\frac{HHH + HHE + EHE}{6*(HHH + HHE + EHE) + 2(HEH + EEH + EEE)} * 1000$$

Proton $^1$H NMR data for polymer characterization was collected at 120° C. in a 5 mm probe using a Varian Spectrometer with a $^1$Hydrogen frequency of 400 MHz. The data was recorded using a maximum pulse width of 45 degrees, 8 seconds between pulses, and signal averaging 120 transients in solvent of $C_2D_2Cl_4$.

The Proton $^1$H NMR data for alumoxane solution characterization was obtained using the method (normalization approach) described at Organometallics, 1998, Vol. 17, No. 10, pp. 1941-1945, except that a Spectrometer with a $^1$Hydrogen frequency of 250 MHz (Bruker DPX 250 Instrument with Bruker XWIN-NMR version 2.1 software) was used. Spectra were obtained at room temperature (approx 23° C.) using a 5 mm probe, and the data were recorded using a maximum pulse width of 45 degrees, 60 seconds between pulses and signal averaging at least 8 transients. The proton shifts were assigned based on referencing the residual downfield peak in deuterated THF as 3.58 ppm (99.9% deuterated). The integration units of the unknown species were defined on the basis of the TMA peak being normalized to 3.0 integration units.

Specifically, MAO samples (30 wt % in toluene) were dissolved in THF-d8 at least 5:1 by volume and spectra taken on a Bruker 250 MHz instrument. Three Al-Me species could be distinguished, the very broad signal due to oligomeric MAO from −0.2 to −1.2 ppm (OAl-Me)x which has an average formula $(AlO_8(CH_3)_{1.4})_x$, the THF-complexed TMA at −0.9 and a smaller upheld peak around −0.55 of unknown formula. The relative amount of the unknown species was also determined and reported in Table 2. The amount of unknown species was found to be inversely proportional to the TMA level.

The supported bis(n-propylcyclopentadienyl)hafnium dimethyl/MAO/TMA catalyst systems used herein were prepared from bis(n-propylcyclopentadienyl)hafnium dimethyl purchased from Boulder Scientific, Colorado, USA; Ineos™ ES757 microsphereoidal silica having a 25 micron average particle size (INEOS); methylalumoxane (30 wt % in toluene, said MAO having approximately 15 wt % trimethylaluminum, e.g., 4.5 wt % of solution received is TMA) purchased from Albemarle; and trimethyl aluminum, reagent grade purchased from Aldrich. The MAO in toluene purchased from Albemarle was sometimes used as received, sometimes combined with $Ph_3COH$ then filtered to remove solids, and was sometimes spiked with TMA. Catalysts were made by reacting the MAO solutions diluted with additional toluene with $(Cp-nPr)_2HfMe_2$ at room temperature for 0.5 hrs. ES 757 (dehydrated at 600° C.) silica was then added to the activated metallocene mixture and reacted for 2 hrs. The supported catalysts were filtered onto a medium glass frit, washed with hexane and dried in vacuo.

Example 1

Ethylene-hexene copolymers were made by reacting ethylene with hexene using supported $(n-PrCp)_2HfMe_2$ catalyst and different activator/co-activator combinations. The data indicate that the activator/co-activator combinations greatly affect the performance and composition of the copolymers as well as the polymerization dynamics.

Catalyst Preparation: Table 1 shows the materials used in preparing the catalysts of this study. The amounts of materials were selected to give the calculated metal loadings shown in Table 1. The level of TMA was increased by addition of neat TMA or decreased by reaction with triphenylmethanol. This reaction preferentially removes the TMA over other Al-methyl species. In this reaction a highly pyrrophoric white solid was formed in addition to small amounts of triphenylethane. The solid was insoluble in toluene and was filtered from the MAO solution before using in supportation. The supported catalysts were filtered onto a medium glass frit, washed with hexane, dried in vacuo and analyzed as shown in Table 2. The supported catalyst systems (SCSs) were then injected with nitrogen into the polymerization reactor as described below.

TABLE 1

| | | Added | | | | Calculated Values* | | |
|---|---|---|---|---|---|---|---|---|
| Catalyst | $(nPr-Cp)_2HfMe_2$ (g) | MAO (g) | TMA (g) | $Ph_3COH$ (g) | ES 757 (g) | Al Wt % | Hf Wt % | Al/Hf mol ratio |
| 36 | 0.62 | 39.7 | 0 | 0 | 62.5 | 7.3 | 0.35 | 135 |
| 37 | 0.62 | 45 | 0 | 3.85 | 62.5 | 7.7 | 0.34 | 146 |
| 39 | 0.67 | 39.7 | 0.35 | 0 | 74.3 | 6.4 | 0.32 | 129 |
| 41 | 0.79 | 39.7 | 1.3 | 0 | 82 | 6.2 | 0.35 | 115 |
| 44 | 0.83 | 45 | 0 | 4.35 | 86.4 | 5.8 | 0.35 | 107 |
| 42 | 0.62 | 39.7 | 0 | 0 | 62.5 | 7.3 | 0.35 | 135 |
| 43 | 0.79 | 39.7 | 1.3 | 0 | 80 | 6.3 | 0.36 | 113 |
| 46 | 1.08 | 63.4 | 0 | 0 | 42.5 | 14.0 | 0.73 | 124 |

*based upon solution of MAO/TMA/Catalyst compound prior to contact with support.

TABLE 2

| | ICPES on polymer product | | | | Measured by | Unknown |
|---|---|---|---|---|---|---|
| Catalyst | Al (ppm) | Hf (ppm) | Al/Hf mol ratio | Si (ppm) | $^1$H NMR wt % TMA as Al* | Integration Units* |
| 36 | | | | | 14.8 | 0.29 |
| 37 | 166 | 9.3 | 118 | 1131 | 8.2 | 0.63 |
| 39 | 211 | 9.9 | 141 | 1131 | 17.3 | 0.16 |
| 41 | 241 | 14.2 | 112 | 1834 | 23 | 0.32 |
| 44 | 179 | 16 | 74 | 1941 | 9.2 | 0.37 |
| 42 | 167 | 8.2 | 135 | 942 | 14.9 | 0.36 |
| 43 | 211 | 11.7 | 119 | 1480 | 21 | 0.20 |
| 46 | 94 | 5 | 124 | 257 | 14.9 | 0.36 |

*determined on MAO solution prior to contact with catalyst compound or support and the integration units of the unknown species are defined on the basis of the TMA peak being normalized to 3.0.

Prior to being deposited on silica, the weight percent of TMA as total Aluminum-methyl species in MAO solutions was quantitatively determined by $^1$H NMR using the method disclosed in Donald W. Imhoff, Larry S. Simeral, Samuel A. Sangokoya, and James H. Peel, *Organometallics*, 1998, No. 17, pp. 1941-1945. MAO samples (30 wt % in toluene) were dissolved in THF-d8 at least 5:1 by volume and $^1$H NMR spectra taken on a Bruker 250 MHz instrument (see FIGS. 1 and 2). Three Al-Me species were distinguished: 1) a first broad signal due to oligomeric MAO from −0.2 to −1.1 ppm $(OAl-Me)_x$ which has an average formula of $(AlO_{0.8}(CH_3)_{14})_x$; 2) a second signal due to the THF-complexed TMA was identified within the broad first signal at −0.9 ppm; and 3) a third smaller up-field peak was identified within the broad first signal at around −0.55 ppm of unknown formula. The wt % of TMA as total Al was determined by integration after baseline correction (as calculated by Bruker XWIN-NMR version 2.1 software using the polynomial function). Representative $^1$H NMR spectra illustrating this method are shown in FIGS. 1 and 2. The proton shifts were assigned based on referencing the residual downfield peak in deuterated THF as 3.58 ppm. The integration units were defined on the basis of the TMA peak being normalized to 3.0 integration units. In addition, the relative amount of the unknown species was also determined and reported in Table 2. Surprisingly, the amount of unknown species was inversely proportional to the TMA level.

Polymerizations

The catalysts were screened in a laboratory gas phase reactor having a fluidized bed reactor equipped with devices for temperature control, catalyst feeding or injection equipment, gas chromatograph analyzer for monitoring and controlling monomer and gas feeds, and equipment for polymer sampling and collecting. The reactor consists of a 6" (15.24 mm) diameter bed section increasing to 10" (25.4 mm) at the reactor top. Gas comes in through a perforated distributor plate allowing fluidization of the bed contents and polymer sample is discharged at the reactor top. The reactor was operated as shown in Table 3. Catalysts 36 to 41 were run with a low hydrogen concentrations. The other catalysts, 42 to 46, were run with a higher concentration of hydrogen. The temperature of the reactor was maintained at 165° F. (74° C.). An ethylene partial pressure of 105 psi (0.7 MPa) was used.

TABLE 3

Reactor Conditions

| Catalyst | Hydrogen Moles (ppm) | Hexene/Ethylene Flow Ratio | Hexene (Mol %) | Ethylene (Mol %) |
|---|---|---|---|---|
| 36 | 130 | 0.04 | 0.2 | 35 |
| 37 | 170 | 0.08 | 0.39 | 35 |
| 39 | 170 | 0.08 | 0.39 | 35 |
| 41 | 170 | 0.08 | 0.39 | 35 |
| 44 | 210 | 0.078 | 0.37 | 35 |
| 42 | 210 | 0.078 | 0.37 | 35 |
| 43 | 210 | 0.078 | 0.37 | 35 |
| 46 | 210 | 0.078 | 0.37 | 35 |

Polymer Characterization

The polymers produced were characterized as shown in Tables 4 to 9.

TABLE 4

| Catalyst | MI (dg/min) | MIR | Density (g/cc) | Tm (° C.) | Hf (J/g) | Tc (° C.) | Hc (J/g) |
|---|---|---|---|---|---|---|---|
| 36 | 1 | 26 | 0.929 | | | | |
| 37 | 0.25 | | 0.916 | 118.6 | 141.5 | 103.9 | −102.5 |
| 39 | 0.57 | | 0.916 | 118.6 | 140.2 | 105.4 | −102.9 |
| 41 | 0.68 | 23 | 0.917 | 118.9 | 141.7 | 106.1 | −100.8 |
| 44 | 0.7 | | 0.916 | 118.4 | 116.9 | 102 | −121.1 |
| 42 | 1.2 | | 0.917 | 118.2 | 123.5 | 103 | −126.5 |
| 43 | 1.1 | 22 | 0.917 | 117.9 | 123.1 | 103 | −123.8 |
| 46 | 1.1 | | 0.917 | 117.2 | 121 | 102 | −124.1 |
| X | 1.0 | 34 | 0.921 | 122.42 | 106.6 | 109.4 | −110.3 |
| Y | 0.95 | 20 | 0.918 | | | | |

Comparative polymer X is an LLDPE (ethylene hexene copolymer) produced in the gas phase (ethylene partial pressure greater than 220 psi, 75° C.) using bis(nPr-Cp)HfMe$_2$ and methylalumoxane (30 wt % MAO in toluene with about 5% TMA). Comparative polymer Y is an LLDPE (ethylene hexene copolymer) produced in the gas phase (ethylene partial pressure less than 190 psi, 85° C.) using bis(nPr-Cp)HfMe$_2$ and methylalumoxane (30 wt % MAO in toluene with about 5% TMA).

TABLE 5

| Catalyst | Mn^ | Mw^ | Mz^ | Mw/Mn | Mz/Mw | 68-70* | 84* | 90* |
|---|---|---|---|---|---|---|---|---|
| 36 | 42572 | 106896 | 205009 | 2.5 | 1.9 | 31 | 42 | 27 |
| 37 | 53817 | 137570 | 265314 | 2.6 | 1.9 | 73 | 19 | 8 |
| 39 | 43474 | 136138 | 289182 | 3.1 | 2.1 | 68 | 24 | 8 |
| 41 | 48823 | 135601 | 287932 | 2.8 | 2.1 | 68 | 26 | 6 |
| 44 | 38940 | 109245 | 235586 | 2.8 | 2.2 | 72 | 21 | 8 |
| 42 | 34270 | 105065 | 230067 | 3.1 | 2.2 | 68 | 26 | 5 |
| 43 | 37632 | 104459 | 218357 | 2.8 | 2.1 | 70 | 24 | 6 |
| 46 | 41384 | 106698 | 226105 | 2.6 | 2.1 | 71 | 22 | 7 |
| X | 32600 | 129800 | 361700 | 4.0 | 2.8 | 44 | 37 | 19 |
| Y | 38695 | 125998 | 269429 | 3.3 | 2.1 | 68 | 24 | 8 |

^measured by GPC,
*Weight Percent Composition by TREF Peak Elution Temp (68° C. to 70° C., 84° C., 90° C.) Cross Fractionation Analysis performed by Polymer Char, Valencia, Spain.

Analysis shows the polymers contain three fractions having different hexene contents: lower density, medium density and higher density materials. Specifically, the most soluble materials have a peak elution temperature between 68° C. and 70° C. This material contains most of the hexene in the resins. It contains the lowest density materials in the resins. These lower density materials composed between 31% and 73% of the resins' total mass. Another fraction has a peak elution temperature of about 84° C. This fraction contains medium density components of the resins. These medium density materials compose 19% to 42% of the resins. The final fraction contains higher density materials. This fraction has a peak elution temperature of about 90° C. It contained 5% to 8% of the resins for all resins except for the resin made from catalyst 36. Twenty seven percent (27%) of the resin made from catalyst 36 is a higher density material.

The ethylene copolymers were analyzed using $^{13}$C NMR spectroscopy (see Table 6).

TABLE 6

$^{13}$C NMR Analysis of Ethylene Hexene Copolymers

| Catalyst | Mol % H | Mol % E | HHH | HHE | EHE | HEH | HEE | EEE |
|---|---|---|---|---|---|---|---|---|
| 36 | 1.6 | 98.4 | 0.0001 | 0.0004 | 0.0156 | 0.0002 | 0.0311 | 0.9527 |
| 37 | 3.4 | 96.6 | 0.0006 | 0.0018 | 0.0323 | 0.0025 | 0.0615 | 0.9013 |
| 39 | 3.5 | 96.5 | 0.0003 | 0.0020 | 0.0331 | 0.0020 | 0.0636 | 0.8990 |
| 41 | 3.36 | 96.64 | 0.0002 | 0.0020 | 0.0318 | 0.0021 | 0.0612 | 0.9028 |
| 44 | 3.51 | 96.49 | 0.0003 | 0.0018 | 0.0335 | 0.0025 | 0.0635 | 0.8984 |
| 42 | 3.24 | 96.76 | 0.0003 | 0.0017 | 0.0309 | 0.0022 | 0.0585 | 0.9064 |
| 43 | 3.29 | 96.71 | 0.0000 | 0.0019 | 0.0313 | 0.0019 | 0.0601 | 0.9048 |
| 46 | 3.21 | 96.79 | 0.0003 | 0.0014 | 0.0309 | 0.0021 | 0.0586 | 0.9068 |
| 46 | 3.35 | 96.65 | 0.0003 | 0.0017 | 0.0318 | 0.0019 | 0.0616 | 0.9027 |
| Y | 3.1 | 96.9 | 0.0000 | 0.0015 | 0.0289 | 0.0017 | 0.0574 | 0.9107 |
| X | 3.31 | 96.69 | 0.0004 | 0.0009 | 0.0254 | 0.0014 | 0.0488 | 0.9231 |

TABLE 7

$^{13}$C NMR Analysis of Ethylene Hexene Copolymers

| Catalyst | Average r1r2 | Run Number | Average Ethylene Run Length | Butyls per 1000 Carbons |
|---|---|---|---|---|
| 36 | 1.16 | 1.6 | 0.62 | 7.8 |
| 37 | 1.27 | 3.3 | 0.29 | 16.2 |
| 39 | 1.04 | 3.4 | 0.29 | 16.5 |
| 41 | 1.04 | 3.3 | 0.30 | 15.9 |
| 44 | 0.94 | 3.4 | 0.28 | 16.6 |
| 42 | 1.07 | 3.1 | 0.31 | 15.4 |
| 43 | 0.85 | 3.2 | 0.30 | 15.6 |
| 46 | 0.94 | 3.1 | 0.31 | 15.3 |
| 46 | 1.01 | 3.3 | 0.30 | 15.8 |
| X | 1.21 | 2.6 | 0.38 | 12.7 |

The polymers produced were processed through an Automated Polymer Compounder mini-extruder operated using counter rotating intermeshing twin screws operated at 50 RPM and 190° C. The formulation was passed through the extruder three times. After a strand from any pass through the extruder was completed, it was cut into pellets and reintroduced into the extruder. Compression-molded films were then made using a Fontijne Press operated at a maximum temperature of 180° C. and pressure of 125 K Newtons (193 kPa). Copolymer samples were placed between the press' platens heated at 180° C., and heated without being under pressure for 22 min. Then the platens were closed and the pressure increased to 125 K Newtons (28 psi/193 kPa). The samples were heated at 190° C. under a 125 K Newtons (193 kPa) of pressure for about 20 min. Then, the platens were opened and the sample cooled to room temperature. The bottom and top platens were cooled using tap water. The sampled cooled at about 18° C./min to about 75° C./min, and then the cooling rate decreases exponentially until the sample reaches 30° C. over about 14 min.

ISO 37:2005 Type 3 Test specimens were stamped out of the compression molded films using a commercial Clicker Press and die. The rectangular shaped test specimens were 8.5 mm wide by 50.8 mm long by the gauge of the film, which ranged from 0.07 mm to 0.15 mm (2.7-5.9 mils, 68.6-150.0 microns). The film's gauge is provided below along with its Tensile Test Result Tensile Testing of compression molded films (Tensile Strength, 1% Secant Modulus, MD and TD) was performed according to ASTM D-882. The Iso37:2005 Type 3 test specimens were evaluated using a Laboratory Instron Tensile tester Instron Model 5565. Three to six test specimens of each film were evaluated using the tester fitted with rubber faced grips and a 1 Newton load cell. The Instron was operated using an initial Grip-to-Grip width of 25.4 mm and a test speed of 200 mm/min. Jaws separation prior to testing was 35 mm, from which strains were calculated assuming affine deformations. All strain values are in terms of the grips' separation distance. All stresses are reported as "engineering" values, i.e., stresses based on the original cross-sectional area of the specimen, taking no account of reduced cross-section as a function of increased strain.

The primary and secondary Tensile at Yield points of each sample were determined as the maximum in the tensile curve between 7% and 40% elongation.

The data are reported in Tables 8A to 8D.

TABLE 8A

| Catalyst ID | Film Thickness (mm) Avg | Youngs Modulus (MPa) Avg | Secant Modulus (MPa) 1% Avg | Secant Modulus (MPa) 2% Avg |
|---|---|---|---|---|
| 36 | 0.908 | 450.3 | 80.84 | 173.59 |
| 37 | 0.101 | 265.0 | 46.85 | 101.66 |
| 39 | 0.104 | 268.4 | 45.82 | 105.72 |
| 41 | 0.997 | 259.5 | 41.22 | 108.67 |
| 44 | 0.107 | 219.2 | 44.14 | 108.01 |
| 42 | 0.101 | 289.5 | 55.91 | 123.59 |
| 43 | 0.072 | 271.7 | 44.39 | 114.65 |
| 46 | 0.095 | 235.5 | 51.50 | 114.16 |
| X | 0.088 | 283.9 | — | — |
| Y | 0.064 | 319.3 | — | — |

TABLE 8B

| | Yield | | Yield Point Primary | | Secondary | |
|---|---|---|---|---|---|---|
| Catalyst ID | Stress (MPa) | Strain (%) | Stress (MPa) | Strain (%) | Stress (MPa) | Strain (%) |
| 36 | 18.3 | 14.4 | 18.1 | 18.3 | — | — |
| 37 | 12.6 | 73.8 | 12.2 | 19.5 | 12.6 | 68.3 |
| 39 | 12.4 | 64.7 | 12.1 | 18.6 | 12.7 | 65.4 |
| 41 | 12.3 | 74.2 | 11.9 | 18.6 | 12.3 | 71.7 |
| 44 | 12.0 | 26.0 | 12.0 | 26.0 | 12.3 | 76.0 |
| 42 | 12.8 | 60.7 | 12.7 | 18.7 | 12.7 | 59.3 |
| 43 | 12.5 | 68.0 | 12.4 | 17.0 | 12.5 | 68.7 |
| 46 | 26.0 | 11.95 | 12.8 | 26.0 | 13.0 | 76.0 |
| X | 21.5 | 13.7 | 13.7 | 20.8 | 13.6 | 82.3 |
| Y | 16.4 | 14.7 | 14.7 | 18.5 | 14.1 | 40.0 |

TABLE 8C

Tensile Stress @ indicated Elongation

| | Elongation | | | | | |
|---|---|---|---|---|---|---|
| Catalyst ID | 100% | 200% | 300% | 400% | 500% | 700% |
| 36 | 16.22 | 16.0 | 16.7 | 19.0 | 20.8 | 28.4 |
| 37 | 12.39 | 12.9 | 14.4 | 16.7 | 19.9 | 30.7 |
| 39 | 12.26 | 12.8 | 14.3 | 16.6 | 20.3 | 32.8 |
| 41 | 12.16 | 12.5 | 13.7 | 15.8 | 18.8 | 31.3 |
| 44 | 12.34 | 12.5 | 13.2 | 15.0 | 17.4 | 32.8 |
| 42 | 12.54 | 12.9 | 14.2 | 16.7 | 20.2 | 33.6 |
| 43 | 12.22 | 12.8 | 13.8 | 16.3 | 20.0 | 34.9 |
| 46 | 12.85 | 13.1 | 13.8 | 15.0 | 17.3 | 24.0 |
| X | 14.18 | 14.6 | 15.2 | 17.95 | 21.2 | 23.6 |
| Y | 13.9 | 14.9 | 15.2 | 17.7 | 20.4 | |

TABLE 8D

| Catalyst ID | Ultimate Stress (MPa) | Ultimate Strain (%) | Strain/Stress Ratio | Strain Hardening Modulus (MPA/%) |
|---|---|---|---|---|
| 36 | 40.08 | 912.01 | 22.8 | 0.059 |
| 37 | 35.88 | 768.32 | 21.4 | 0.075 |
| 39 | 38.36 | 765.11 | 19.9 | 0.087 |
| 41 | 39.67 | 793.51 | 20.0 | 0.091 |
| 44 | 35.41 | 942.56 | 26.6 | 0.053 |
| 42 | 45.81 | 834.32 | 18.2 | 0.102 |
| 43 | 45.32 | 790.54 | 17.4 | 0.116 |
| 46 | 32.74 | 891.67 | 27.2 | 0.046 |
| X | 43.7 | 749 | 17.1 | 0.105 |
| Y | 41.0 | 887.2 | 21.6 | 0.072 |

Compression-molded circular disks were made from the polymer processed through the extruder using a Fontijne Press as described above for the Compression-molded films. The disks were evaluated according to ASTM D-1922 for Elmendorf Tear performance. Specimens used in this testing had normally distributed gauges and tear values that were under statistical process control: with Coefficients of Variance (Cv*) less than 10%. The results of the analysis are shown in the following Table 8E.

TABLE 8E

| | Elmendorf Tear | | | | | | |
|---|---|---|---|---|---|---|---|
| | Gauge (mils) | | | Tear (grams) | | | Tear (grams/mil) |
| Catalyst ID | Average | Standard Deviation | Cv* | Average | Standard Deviation | Cv* | Average |
| 37 | 3.0 | 0.2 | 6 | 967.1 | 64 | 7 | 325 |
| 39 | 2.8 | 0.2 | 6 | 901.9 | 83 | 9 | 310 |

The poor performance of the copolymer made from catalyst 44 is possibly due to its exceptionally low Aluminum/Hafnium ratio of 74:1.

For reference purposes the following data is included.

TABLE 9A

Selected Physical and Mechanical Properties of ZN-LLDPE[#] and m-LLDPE films.*

| Resin | Comonomer Type/Loading (mol %) | MI (g/10 min) | Density (g/cc) | MD 1% Secant Modulus (MPa) | MD Yield Stress (MPa) | MD Ultimate Properties (%) | MD Ultimate Properties (MPa) |
|---|---|---|---|---|---|---|---|
| LL 1001[#] | C4/3.6 | 1.0 | 0.918 | 220 | 9.4 | 590 | 57.0 |
| LL 3001[#] | C6/3.6 | 1.0 | 0.917 | 200 | 9.0 | 500 | 58.0 |
| Exact 4056* | C6/>3.5 | 2.2 | 0.833 | 30 | 3.5 | 390 | 64.3 |
| Exact 4151* | C6 > 3.5 | 2.2 | 0.889 | 56 | 5.4 | 400 | 84.8 |
| Exceed 1012* | C6/3.5 | 1.0 | 0.912 | 131 | 7.4 | 500 | 72.6 |
| Exceed 1018* | C6/1.5 | 1.0 | 0.918 | 183 | 9.2 | 540 | 74.5 |
| Exceed 1023* | C6/<1.5 | 1.0 | 0.923 | 240 | 11.0 | 542.0 | 65.0 |

*Data in Tables 9A and 9B were taken from ExxonMobil's technical data sheets.

TABLE 9B

Selected Physical and Mechanical Properties of ZN-LLDPE[#] and m-LLDPE films.*

| Resin | MD Ultimate Strain/Stress Ratio | Elmendorf Tear MD (g/micron) | Elmendorf Tear TD (g/micron) | TD/MD Ratio | Dart Drop (g/micron)* |
|---|---|---|---|---|---|
| LL 1001[#] | 10.4 | 4.0 | 16.0 | — | 4.0 |
| LL 3001[#] | 8.6 | 17.3 | 17.3 | — | 5.5 |
| Exact 4056* | 6.1 | 2.2 | 5.3 | — | 32.4 |
| Exact 4151* | 4.7 | 3.5 | 11.0 | — | 37.0 |
| Exceed 1012* | 6.9 | 8.3 | 13.0 | 1.6 | 32.2 |
| Exceed 1018* | 7.2 | 11.0 | 18.1 | 1.6 | 22.4 |
| Exceed 1023* | 8.3 | 7.0 | 21.1 | 3.0 | 7.4 |

*Data in Tables 9A and 9B were taken from ExxonMobil's technical data sheets.

Table 10 shows selected tensile properties of thin compression molded plaques (at about 16% elongation) of the polymers in Tables 9A and 9B and prepared as described above.

TABLE 10

Selected Physical and Mechanical Properties of ZN-LLDPE and m-LLDPE resins.

| Catalyst/Resin Type | Youngs Modulus (MPa) | MD Yield Stress (MPa) | MD Ultimate Strain (%) | MD Ultimate Stress (MPa) | MD Ultimate Strain/Stress Ratio |
|---|---|---|---|---|---|
| LL 1001 | 308 | 14.5 | 1194 | 36.1 | 33 |
| LL 3001 | 303 | 14.0 | 1050 | 33.2 | 32 |
| Exact 4056 | 12 | 3.6 | 592 | 31.6 | 19 |
| Exact 4151 | 16 | 5.7 | 698 | 51.8 | 13 |
| Exceed 1012 | 251 | 12.7 | 978 | 46.6 | 21 |
| Exceed 1018 | 304 | 14.56 | 997 | 46.5 | 21 |
| Exceed 1023 | 342 | 15.8 | 900 | 35.8 | 25 |

Several comparative blown films of ethylene-hexene copolymers (3 mol % hexene, melt index ratio 31.4 (ASTM D-1238), density 0.921 g/cc) were prepared according to the general procedure in Example 1 of US 2009/0297810 (U.S. Ser. No. 12/130,135, filed May 30, 2008) and any references referred to therein. The specific conversion conditions are described in Table 11A and the mechanical properties are described in Table 11B.

TABLE 11A

Selected Processing Conditions

| Trail | Die Diameter (mm) | Die Gap (mm) | Output (kg/h) | BUR | Film gauge (μm) | FLH (mm) | DDR | STR | PRT |
|---|---|---|---|---|---|---|---|---|---|
| 55 | 200 | 2.5 | 130.0 | 1.25 | 50 | 600 | 33.48 | 1.62 | 2.17 |
| 75 | 200 | 2.5 | 78.0 | 1.50 | 50 | 300 | 27.90 | 1.61 | 2.07 |
| 24 | 160 | 1.4 | 200 | 2.5 | 20 | 810 | 7.81 | 3.18 | 0.65 |
| 16 | 160 | 1.4 | 160 | 3 | 20 | 730 | 19.53 | 1.27 | 2.34 |
| 13 | 160 | 1.4 | 110 | 3.00 | 20 | 540 | 19.53 | 1.93 | 1.54 |
| 14 | 160 | 1.4 | 130 | 2.00 | 20 | 630 | 29.29 | 2.99 | 1.13 |

BUR = blow up ratio,
FLH is frost line height,
DDR is draw down ratio,
STR is stretch rate,
PRT is process time.

TABLE 11B

Selected Properties of Films

| Trail | 1% Secant Modulus (MPa) | | MD Stress at 100% Elongation (MPa) | Elmendorf Tear (g/micron) | | Dart Drop (g/micron) | Tensile at Break (MPa) | | Elongation at Break (%) | |
|---|---|---|---|---|---|---|---|---|---|---|
| | MD | TD | | MD | TD | | MD | TD | MD | TD |
| 55 | 237 | 268 | 15 | 15.32 | 20.99 | 12.21 | 75.4 | 52.6 | 369 | 601 |
| 75 | — | — | 14.34 | 13.65 | 17.77 | 15.81 | 46.2 | 42.1 | 481 | 1016 |
| 24 | 250 | 298 | 16.17 | 24.92 | 20.59 | 29.20 | 75.6 | 41.6 | 282 | 621 |
| 16 | 243 | 297 | 15.1 | 18.11 | 18.43 | 51.53 | 67.2 | 50.6 | 314 | 631 |
| 13 | 265 | 356 | 15.28 | 21.29 | 20.97 | 54.03 | 55.8 | 48.7 | 573 | 656 |
| 14 | 253 | 322 | 19.57 | 51.15 | 32.20 | 8.50 | 61.4 | 46.1 | 522 | 601 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise the term "comprising" encompasses the terms "consisting essentially of," "is," and "consisting of" and anyplace "comprising" is used "consisting essentially of," "is," or "consisting of" may be substituted therefor.

What is claimed is:

1. A process to produce block ethylene copolymers comprising adjusting the amount of trimethyl aluminum in a catalyst system comprising methylalumoxane solution and a metallocene transition metal complex prior to use as an activator to obtain block segments with [HHH] comonomer triad fractions that differ by at least 5% relative to each other.

2. The process of claim 1, wherein the process is a continuous process and the trimethylaluminum is adjusted on-line prior to entry into a polymerization reactor.

3. The process of claim 2, wherein the trimethylaluminum is added intermittently to the methylalumoxane solution before or after combination with a catalyst compound.

4. The process of claim 1, wherein the amount of trimethylaluminum is adjusted by adding a Bronsted Acid to the methylalumoxane solution before or after combination with a catalyst compound.

5. The process of claim 4, wherein the amount of trimethylaluminum is adjusted by adding a Bronsted Acid to the methylalumoxane solution before or after combination with a catalyst compound.

6. The process of claim 1, wherein the amount of trimethylaluminum is adjusted by adding a Bronsted Acid to the methylalumoxane solution before or after combination with a catalyst compound.

* * * * *